(12) United States Patent
Jung et al.

(10) Patent No.: US 12,497,354 B2
(45) Date of Patent: Dec. 16, 2025

(54) EFFICIENT CONVERSION OF METHANE TO METHANESULFONIC ACID VIA TRIFLUOROACETYLSULFURIC ACID

(71) Applicant: University of Southern California, Los Angeles, CA (US)

(72) Inventors: Kyung Woon Jung, Fullerton, CA (US); Sungah Kim, Los Angeles, CA (US); Jen-Chieh Wang, Los Angeles, CA (US); Joo Ho Lee, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 411 days.

(21) Appl. No.: 18/101,973

(22) Filed: Jan. 26, 2023

(65) Prior Publication Data
US 2023/0242477 A1    Aug. 3, 2023

Related U.S. Application Data

(60) Provisional application No. 63/303,074, filed on Jan. 26, 2022.

(51) Int. Cl.
*C07C 303/14* (2006.01)
*C07C 303/24* (2006.01)

(52) U.S. Cl.
CPC .......... *C07C 303/14* (2013.01); *C07C 303/24* (2013.01)

(58) Field of Classification Search
CPC .............. C07C 303/14; C07C 309/04
USPC ....................... 562/121
See application file for complete search history.

(56) References Cited

U.S. PATENT DOCUMENTS

2006/0100458 A1* 5/2006 Sen ............... C07C 303/02
562/98

OTHER PUBLICATIONS

Kim, S. et al., "Methane Sulfonation via a Free-Radical Mechanism by Trifluoroacetylsulfurica Acid," J. Org. Chem. 2022, 87, 15, pp. 10539-10543.
Kim, S. et al., "Methane Sulfonation via a Free-Radical Mechanism by Trifluoroacetylsulfurica Acid," J. Org. Chem. 2022, 87, 15, pp. 10539-10543 (Supplemental Materials, 16 pgs.).
Kim, S. et al., "Novel methane activation by sulfur dioxide and molecular oxygen via trifluoroacetylsulfuric acid," Green Chem., 2022, 24, pp. 7918-7923.
Kim, S.et al., "Novel methane activation by sulfur dioxide and molecular oxygen via trifluoroacetylsulfuric acid," Green Chem., 2022, 24, pp. 7918-7923 (Suppelemental Materials, 8 pgs).
Zargari, N. et al., "Unexpected, Latent Radical Reaction of Methane Propagated by Trifluoromethyl Radicals", The Journal of Organic Chemistry, 2016, 81, pp. 9820-9825.

* cited by examiner

*Primary Examiner* — Ana Z Muresan
(74) *Attorney, Agent, or Firm* — Brooks Kushman P.C.

(57) ABSTRACT

For methane activation, various sulfonation systems using $SO_3$ or $H_2SO_4$ have been well studied, however, sulfur dioxide ($SO_2$), a preliminary source of $SO_3$ and $H_2SO_4$, has not been used successfully. Herein, we report a novel methane sulfonation method to produce methanesulfonic acid (MSA) utilizing sulfur dioxide by a free radical mechanism. In the presence of $H_2O_2$ as a radical initiator, the reaction of $SO_2$ and $O_2$ in trifluoroacetic acid (TFAOH) furnished trifluoroacetylsulfuric acid ($TFAOSO_3H$), which served as the radical propagator to facilitate H-abstraction of methane at low temperatures. In typical reactions, sulfur dioxide was incorporated into MSA in 75% with high selectivity at 60° C.

21 Claims, 22 Drawing Sheets

Scheme 4.

Scheme 5

Before aq. work-up (7 : 10 : MSA = 7 : 1 : 3).

EFFICIENT CONVERSION OF METHANE TO METHANESULFONIC ACID VIA TRIFLUOROACETYLSULFURIC ACID

CROSS-REFERENCE TO RELATED APPLICATIONS

This application claims the benefit of U.S. provisional application Ser. No. 63/303,074 filed Jan. 26, 2022, the disclosure of which is hereby incorporated in its entirety by reference herein.

TECHNICAL FIELD

In at least one aspect, the present invention is related to the preparation of sulfonated alkane, and in particular, to the preparation of methanesulfonic acid.

BACKGROUND

Methane, the most copious but least reactive hydrocarbon in natural gases,[1] remains as the environmental problem of carbon dioxide emission due to massive flaring.[2] Because of its pernicious effect as a greenhouse gas, it captured attention from the scientific community and became a focal concern to develop new strategies. To address this environmental challenge, a strategy of converting methane into transportable liquid products such as methanol, formic acid, or methanesulfonic acid (MSA) with enhanced efficiency is preferred, different from the existing energy-demanding syngas generation/Fischer-Tropsch technique. Sulfur dioxide is another noxious gas that contributes to air pollution as an indirect greenhouse gas and the cause of acid rain. Typically, $SO_2$ can be converted to $SO_3$ by reacting with $O_2$ at the cost of large amounts of energy and costly catalysts such as platinum or activated carbon.[3] To improve these known harsh conditions, we embarked on in situ activation of both methane and sulfur dioxide as well as evaluation of possible radical pathways.

Various catalytic systems have been developed for the direct conversion of methane into alcohol derivatives, and yet it remains with several challenges to overcome, including low yields and overoxidation of products.[4-8] On the contrary, methanesulfonic acid (MSA), which is less prone to overoxidation with various applications such as cleaning agents, electrolytes, and protecting groups in pharmaceutical chemistry, emerged as an alternative methane activation method.[9-10] Furthermore, from an environmental standpoint, the development of MSA by consuming $CH_4$ and $SO_2/SO_3/H_2SO_4$ is exceptionally irresistible.

Since its remarkable report by Snyder, Oleum (fuming sulfuric acid) has been employed predominantly for methane sulfonation. Their conditions required catalytic $HgSO_4$ at elevated temperatures and produced a mixture of oxygenated and sulfonated compounds presumably by various mechanistic pathways.[11] Sen and Bell developed radical conditions, which turned out to be efficient and selective, mainly yielding methanesulfonic acid. Radical initiators they used were potassium persulfate[12] and metal peroxo species.[13] Recently, Diaz-Urrutia and Ott reported a selective conversion of methane and oleum to methanesulfonic acid while using a sulfonyl peroxide derivative as an electrophilic initiator.[14] Through a mechanistic study, they proposed the activation of the C—H bond of $CH_4$ via the electrophilic oxygen atom of the sulfonyl peroxides generating $CH_3^+$ as a key intermediate in the cationic chain reaction, whereas Singleton proposed a potential free-radical mechanism on this reaction instead of a cation chain reaction on the grounds of a free energy-favored face-to-face complex of $CH_3\cdot$ with $SO_3$.[15]

SUMMARY

In at least one aspect, a method for sulfonating a hydrocarbon is provided. The method includes a step of providing a solvent mixture of trifluoroacetic acid and trifluoroacetic acid anhydride that is substantially water-free. Hydrogen peroxide, a $C_{1-10}$ alkane, molecular oxygen, and sulfur dioxide is added to the solvent mixture to form a reaction mixture. The reaction mixture is allowed to react for a predetermined time within a predetermined temperature range and within a predetermined pressure range. The reaction mixture is quenched to obtain sulfonated $C_{1-10}$ alkanes.

In another aspect, a method for preparing trifluoroacetyl sulfuric acid is provided. The method includes a step of providing a solvent including (or consisting of) trifluoroacetic acid, trifluoroacetic acid anhydride, and mixtures thereof that is substantially water-free. Molecular oxygen and sulfur dioxide are added to the solvent to form a reaction mixture. The reaction mixture is allowed to react for a predetermined time within a predetermined temperature range and within a predetermined pressure range.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1A:
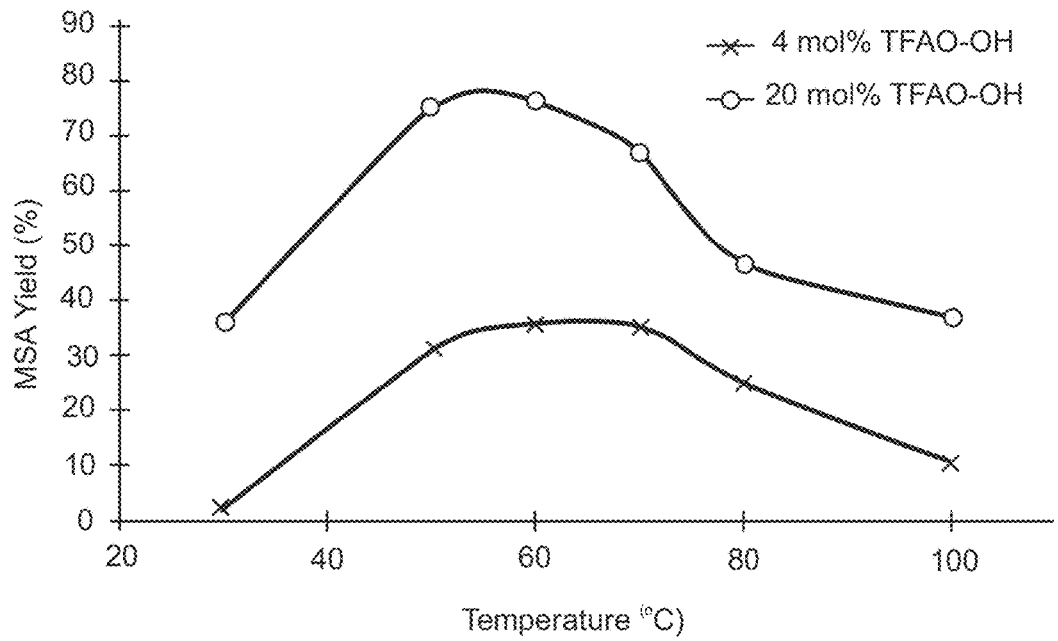
FIGS. 1(A) and 1(B). Successful activation of sulfur dioxide and methane at various (A) trifluoroperacetic acid concentrations and (B) temperatures. MSA percent yields were based on $SO_2$. (A) Reaction conditions: solvent, TFAOH (0.3 mL) and TFAA (0.3 mL); $H_2O_2$ (×0.03 mmol, 4 mol % based on $SO_2$; circle 0.15 mmol, 20 mol %); $SO_2$ (40 psi, 0.73 mmol); $O_2$ (×20 psi, 0.07 mmol; circle 30 psi, 0.12 mmol); $CH_4$ (200 psi, 3.3-3.4 mmol); time (18 h). (B) Reaction conditions: solvent, TFAA (0.6 mL); $H_2O_2$ (0.03-1.2 mmol, 4-160 mol % based on $SO_2$); $SO_2$ (40 psi, 0.73 mmol); $CH_4$ (200 psi, 3 mmol); temperature (50° C.); time (18 h); $O_2$ (square 20 psi, 0.07 mmol, 10 mol % based on $SO_2$) or triangle without $O_2$.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Ratios expressed as a single number n mean n:1.

The term "alkyl" refers to C$_{1-20}$ inclusive, linear (i.e., "straight-chain"), branched, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a C$_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g. pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

The term "alkane" means a straight chain or branched, noncyclic or cyclic, saturated aliphatic hydrocarbon. Typically, useful noncyclic alkanes include 1 to 10 carbons and useful cyclic alkanes include 3 to 10 carbons. In a refinement, useful cyclic alkanes include 3 to 6 carbons. Cyclic alkanes can include multiple rings.

Throughout this application, where publications are referenced, the disclosures of these publications in their entireties are hereby incorporated by reference into this application to more fully describe the state of the art to which this invention pertains.

In at least one aspect, a method for sulfonating a hydrocarbon is provided. The method includes a step of providing a solvent mixture of trifluoroacetic acid and trifluoroacetic acid anhydride that is substantially water-free. In this context, "substantially water-free" means that the solvent mixture includes water in an amount of less than in increasing order of preference, 1%, 0.5%, 0.1%, 0.05%, 0.01%, or 0.005% of the total weight of the solvent mixture. Hydrogen peroxide, an alkane, molecular oxygen, and sulfur dioxide are added to the solvent mixture to form a reaction mixture. The reaction mixture is allowed to react for a predetermined time within a predetermined temperature range and within a predetermined pressure range. Typically, the predetermined time is from 1 to 30 hours. The reaction mixture is quenched to obtain sulfonated alkanes (i.e., an alkyl sulfonic acid). The alkane can be a noncyclic alkane or a cyclic alkane, and in particular, a $C_{1-10}$ noncyclic alkane or a $C_{3-10}$ cyclic alkane. In a refinement, the reaction mixture is quenched with water or an alcohol (e.g., methanol, ethanol, etc.). Due to the pressures involved, the reactants are typically reacted in a metal pressure reactor (e.g., a stainless steel bomb). It should be appreciated that salts of the sulfonated alkanes can also be obtain depending on the chemical workup.

In a variation, the $C_{1-10}$ noncyclic alkane is selected from the group consisting of methane, ethane, propane, butane, isobutane, pentanes, hexanes, octanes, to produce methanesulfonic acid, butanesulfonic acid, isobutanesulfonic acid, pentanesulfonic acid, hexanesulfonic acid, and octanesulfonic acid, respectively. Combinations of the $C_{1-10}$ alkanes can also be used. In a refinement, $C_{1-10}$ alkane is methane, ethane, or propane. In a further refinement, the $C_{1-10}$ alkane is methane. It should be appreciated that all branching patterns for the alkanes are included for the $C_{1-10}$ noncyclic.

In a variation, the $C_{3-10}$ cyclic alkane is selected from the group consisting of cyclopropane, cyclobutane, cyclopentane, and cyclohexane to produce cyclopropanesulfonic acid, cyclobutanesulfonic acid, cyclopentanesulfonic acid, and cyclohexaneulfonic acid, respectively. Combinations of the $C_{1-10}$ alkanes can also be used.

In another variation, the predetermined temperature range is from 40 to 100° C. In a refinement, the predetermined pressure range is from 15 to 800 psi. In a further refinement, the reaction mixture includes hydrogen peroxide in an amount from about 4 to 160 mol % relative to sulfur dioxide. In some refinements, the reaction mixture includes hydrogen peroxide in an amount of at least 4 mol %, 10 mol %, 20 mol %, 30 mol %, 40 mol %, 50 mol %, 60 mol %, or 70 mol % relative to sulfur dioxide. In further refinements, the reaction mixture includes hydrogen peroxide in an amount of at most 160 mol %, 150 mol %, 140 mol %, 130 mol %, 120 mol %, 110 mol %, 100 mol %, or 900 mol % relative to sulfur dioxide.

In some variations, the reaction mixture includes hydrogen peroxide in an amount from about 10 to 30 mol % relative to sulfur dioxide. In a refinement, the molar ratio of trifluoroacetic acid to trifluoroacetic acid anhydride is from about 0.3 (i.e., 0.3:1) to 3 (i.e., 3:1). In a further refinement, the molar ratio of trifluoroacetic acid to trifluoroacetic acid anhydride is from about 0.8 (i.e., 0.8:1) to 1.2 (i.e., 1.2:1). In some refinements, the molar ratio of trifluoroacetic acid to trifluoroacetic acid anhydride is at least 0.3, 0.4, 0.5, 0.6, 0.7, 0.8, 0.9, 1.0, 1.2, or 1.4. In further refinements, the molar ratio of trifluoroacetic acid to trifluoroacetic acid anhydride is at most 3, 2.8, 2.6, 2.4, 2.2, 2.0, 1.9, 1.8, 1.7, or 1.6.

Advantageously, the $C_{1-10}$ alkane is present in a sufficient amount so that the $C_{1-10}$ alkane is the limiting reagent which lead increased yields. In this regard, the molar ratio of $C_{1-10}$ alkane to sulfur dioxide is greater than 1. In a refinement, the molar ratio of $C_{1-10}$ alkane to sulfur dioxide is greater than 1.5 (i.e., 1.5:1). In some refinements, the molar ratio of $C_{1-10}$ alkane to sulfur dioxide is at least 1.5, 2.0, 2.5, 3, 5, or 10. In further refinements, the molar ratio of $C_{1-10}$ alkane to sulfur dioxide is at most 100, 80, 60, 50, or 20.

In some variations, the molar ratio of $SO_2$ to $O_2$ is from 1 to 10. In some variations, the molar ratio of the molar ratio of $SO_2$ to $O_2$ at least 1, 2, 2.5, 3, or 3.5. In further refinements, the molar ratio of the molar ratio of $SO_2$ to $O_2$ at most 10, 8, 6, 5, or 4.

In another variation, an inert gas (e.g., $N_2$) is added to the pressure vessel to increase the pressure and thereby increase the conversion efficiency of the reaction to the sulfonated $C_{1-10}$ alkane as compared to the reaction when an inert gas is not provided thereto.

In another embodiment, a method for preparing trifluoroacetyl sulfuric acid is provided. the method includes a step of providing a solvent consisting of trifluoroacetic acid, trifluoroacetic acid anhydride, and mixtures thereof that is substantially water-free. In this context, "substantially water-free" means that the solvent or solvent mixture includes water in an amount of less than in increasing order of preference, 1%, 0.5%, 0.1%, 0.05%, 0.01%, or 0.005% of the total weight of the solvent or solvent mixture. Molecular oxygen and sulfur dioxide are added to the solvent to form a reaction mixture. The reaction mixture is allowed to react for a predetermined time within a predetermined temperature range and within a predetermined pressure range. Typically, the predetermined time is from 1 to 30 hours, the predetermined temperature range is from 40 to 100° C., and the predetermined pressure range is from 10 to 400 psi.

The following examples illustrate the various embodiments of the present invention. Those skilled in the art will recognize many variations that are within the spirit of the present invention and scope of the claims.

Scheme 1. Methane activation via trifluoroperacetic acid and trifluoroacetyl sulfuric acid.

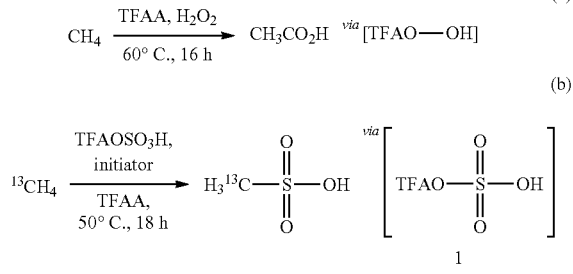

As depicted in reaction (a), Scheme 1, our group clarified the background radical pathway in Pd(II)-catalyzed methane oxidation, where acetic acid (AcOH) was observed as the unwanted side product in addition to the desired product of methyl trifluoroacetate (TFAOMe).[16] Intermediate trifluoroperacetic acid (TFAO—OH) prepared from $H_2O_2$ and TFAA produced the trifluoromethyl radical (·$CF_3$), which effected the C—H bond activation of methane, and the resulting ·$CH_3$ radical reacted with TFAA to produce AcOH. Both previous and current protocols employed radical pathways, yet our current method differed to avoid the formation of a trifluoromethyl radical and AcOH product (reaction (b), Scheme 1).

Another new feature of our sulfonation method is the key intermediate, $TFAOSO_3H$, and its following radical chain carrier. We believed that all of the previous reactions of methane with $SO_3$, including Diaz-Urrutia and Ott's impressive methods, underwent radical pathways unlike their mechanistic claim via a methyl sulfonate radical ($CH_3SO_3$·), which is reminiscent of our newly explored $(TFAO)CH_3S(OH)O_2$·. Both crucial intermediates would serve as propagation radicals to activate the C—H bond of methane and generate methyl radical ($CH_3$·) for the selective synthesis of MSA.

Scheme 2. Methane sulfonation using trifluoroacetylsulfuric acid ($TFAOSO_3H$)generated from sulfuric acid or sulfur dioxide and molecular oxygen.

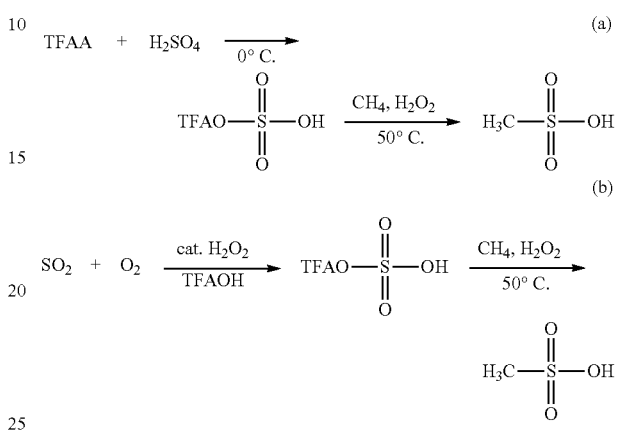

We discovered a methane sulfonation method using trifluoroacetylsulfuric acid ($TFAOSO_3H$) through a radical pathway under mild conditions (reaction (a), Scheme 2).[17] In the presence of radical initiators, the crude solution of $TFAOSO_3H$, arising from $H_2SO_4$ or $SO_3$, successfully converted methane to methanesulfonyl trifluoroacetic anhydride ($TFAOSO_2CH_3$) followed by hydrolysis upon quenching with water into methanesulfonic acid (MSA) in 94 and 86% conversion of $TFAOSO_3H$ and $CH_4$, respectively. Recently, we embarked on the development of practical conditions to use $SO_2$ and the subsequent methane functionalization (reaction (b), Scheme 2). Our extensive screening led to the optimal conditions to react $SO_2$ and $O_2$ by employing the radical initiator trifluoroperacetic acid (TFAO-OH). Then, in situ produced $SO_3$ afforded $TFAOSO_3H$, which effected methane sulfonation similarly to our earlier study. When 20 mol % $H_2O_2$ was added to a TFAOH/TFAA solution, $SO_2$, $O_2$, and $^{13}CH_4$ were successfully converted to MSA. This one-pot two-step synthesis at 50° C. yielded MSA selectively in 74% based on $SO_2$ gas added in 18 h. From an environmental standpoint, this protocol to furnish MSA with the consumption of two toxic gases, $CH_4$ and $SO_2$, is exceptionally irresistible. Furthermore, it allows us to overcome the known harsh conditions using $SO_2$ by adopting a possible radical mechanism, where we carried out an in situ activation of both methane and sulfur dioxide at low temperatures without applying much energy.

Results and Discussion

Figure 19:
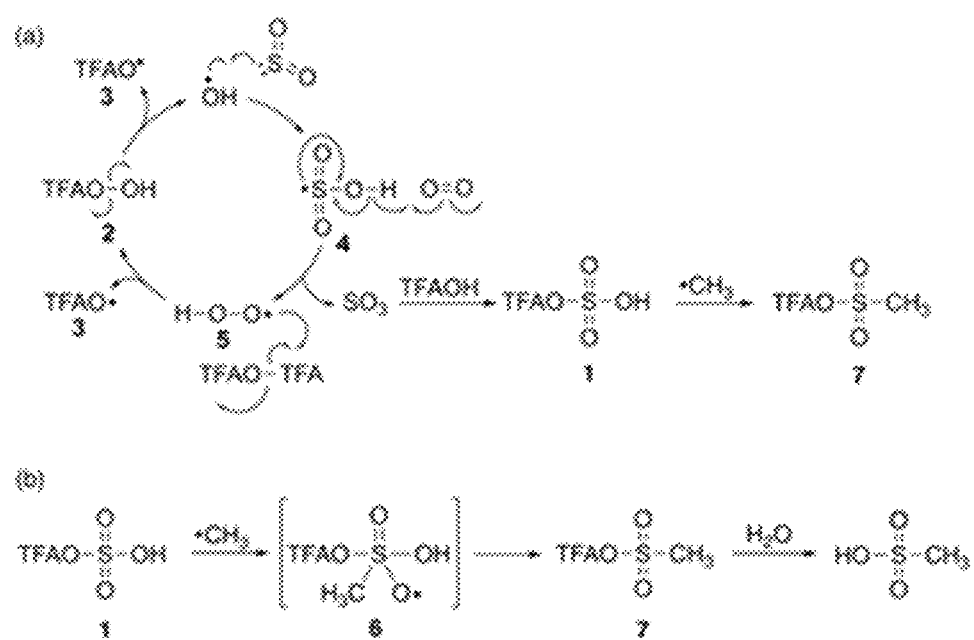
FIG. 19. Scheme 3: Rationale for mechanistic pathways to generate trifluoroacetyl sulfuric acid.

Scheme 3 (FIG. 19). Rationale for mechanistic pathways to generate trifluoroacetyl sulfuric acid.

A proposed mechanism for $SO_2$ oxidation producing trifluoroacetylsulfuric acid ($TFAOSO_3H$, 1) is presented in Scheme 3(a). Peracid TFAO-OH (2) can undergo radical dissociation to produce TFAO· (3) and the hydroxyl radical (OH). The subsequent reaction of OH and $SO_2$ may furnish the radical ·$SO_3H$ (4), which then reacts with $O_2$ to generate $SO_3$ and ·OOH (5).[18,19] The resultant OOH radical (5) and TFAA would regenerate TFAO-OH (2), propagating the radical cycle. Ultimately, the reaction between the produced $SO_3$ and TFAOH can lead to the formation of $TFAOSO_3H$, which is readily capable of methane sulfonation via a free radical mechanism.[17] The methyl radical generated from $CH_4$ and a radical initiator reacted with $TFAOSO_3H$ (1) to produce the key radical intermediate 6 $((TFAO)CH_3S(OH)O_2·)$ (Scheme 3(b)). Subsequent decomposition smoothly afforded $TFAOSO_2CH_3$ (7), which was hydrolyzed upon the addition of water to complete the two-step process from $SO_2$ and $CH_4$ to MSA.

We further investigated the initially optimized conditions for possible higher efficiency by carrying out the one-pot conversion of both $SO_2$ and $CH_4$ to MSA. When the reaction was set up, all the reagents, gases, and solvents were placed in a closed stainless-steel reactor having a high-pressure valve: $SO_2$, $O_2$, and 250 psi of $^{13}CH_4$ gases were charged to a solution of TFAOH/TFAA containing catalytic amounts of $H_2O_2$. After an 18-hour reaction at 50° C., MSA was the predominant isotopically-labeled product in a 74% conversion yield based on the added $SO_2$. Only negligible amounts of byproducts were observed, suggesting the high selectivity of this sulfonation method using $SO_2$. While a typical reaction was conducted for 18 hours, over 90% of the maximum yield was achieved within 2 hours. Furthermore, the activation of $SO_2$ and $CH_4$ was successful at low temperatures such as 40° C.; however, raising the temperature over 70° C. led to a decrease in MSA percent yields (FIG. 1(A)). Regardless of the amount of the catalyst, MSA formation was optimal at around 50-60° C.

Figure 1B:
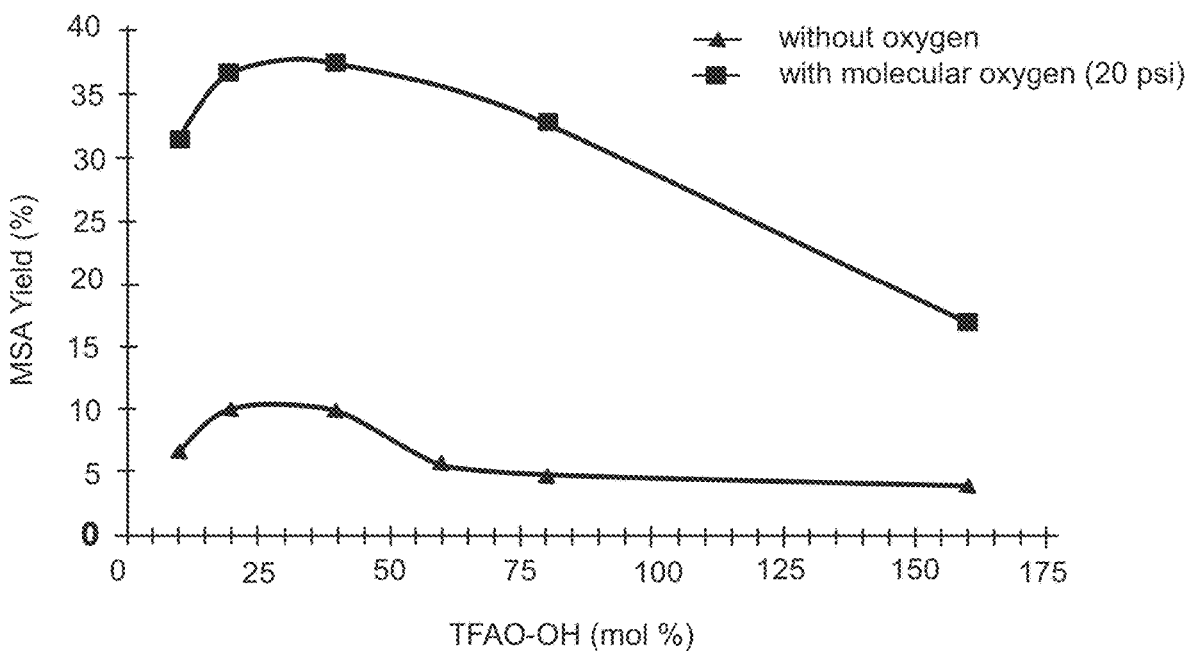

To probe the significance of molecular oxygen in the reaction, we ran the reactions with and without $O_2$ under various concentrations of TFAO—OH. When $O_2$ was excluded from the typical reaction conditions, the percent yields of MSA diminished drastically (FIG. 1(B), triangle) compared to the conditions with oxygen (FIG. 1(B), square). Moreover, additional amounts of TFAO—OH such as 50 mol % or higher did not lead to a meaningful increase in the generation of MSA in the absence of $O_2$, implying that TFAO—OH is not an $O_2$ surrogate. Likewise, in the presence of 10 mol % $O_2$, excess amounts of TFAO—OH did not lead to higher yields, while 15-40 mol % of TFAO—OH appeared as the optimal concentrations (FIG. 1(B), square). These results indicate that molecular oxygen would function as a key reactant to be incorporated into the final product. Thus, TFAO—OH would not be able to replace $O_2$ as a reactant, playing a restricted role primarily as a radical initiator/propagator.

Figure 2:
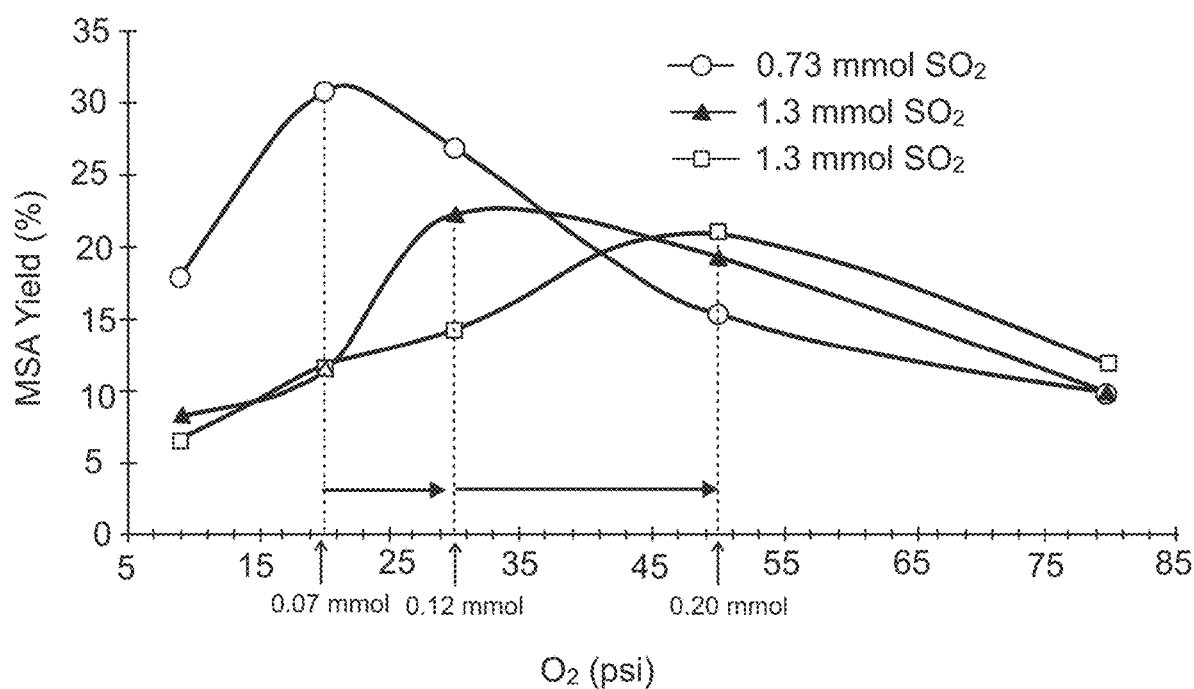
FIG. 2. Yields of MSA under various ratios of sulfur dioxide and molecular oxygen. MSA percent yields were based on $SO_2$. Reaction conditions: solvent, TFAOH (0.3 mL) and TFAA (0.3 mL); $H_2O_2$ (0.027 mmol); $SO_2$ (circle 0.73 mmol, triangle 1.3 mmol, square 1.9 mmol); $O_2$ (9-80 psi, 0.03-0.36 mmol); $CH_4$ (200 psi, 2.8 mmol); temperature (50° C.); time (18 h).

Molecular oxygen behaved as a reactant in the $TFAOSO_3H$ generation, but it acted as an inhibitor in methane sulfonation,[17] preventing the increase in $O_2$ concentration over a certain extent. As illustrated in FIG. 2, the optimal ratio of $SO_2$ and $O_2$ was sought by varying the amounts of $SO_2$ and $O_2$ in the presence of a catalyst—0.027 mmol TFAO-OH (1 mol % based on $CH_4$). Upon raising the $O_2$ concentration gradually, MSA yields increased up to a certain point and then decreased distinctly for all three tested concentrations of $SO_2$. More $O_2$ was required to reach the maximum yield as we increased the $SO_2$ concentration, yet the molar ratio of $SO_2$ and $O_2$ for each peak at which the reaction gave the highest yield remained the same regardless of the amount of $SO_2$ ($SO_2:O_2=10:1$).

Figure 3:
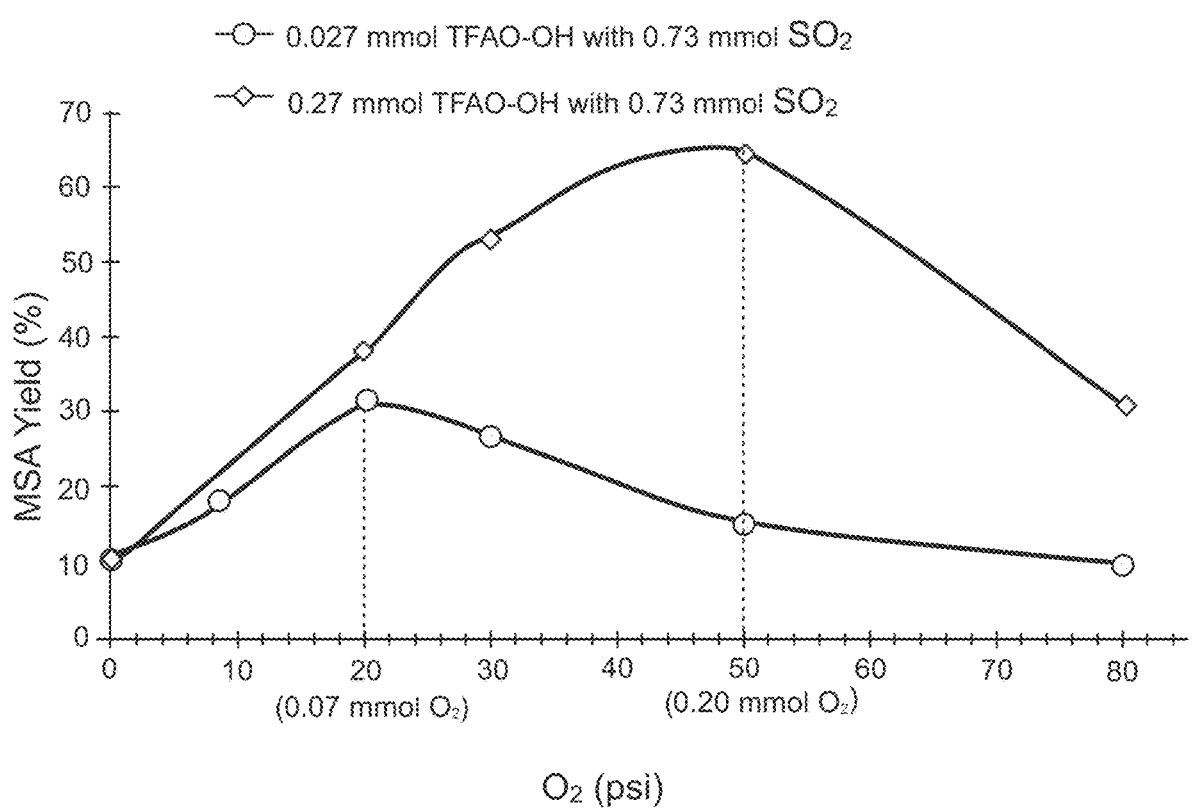
FIG. 3. Determination of the optimal ratio between sulfur dioxide and molecular oxygen at various trifluoroperacetic acid concentrations. The optimal ratios between $SO_2$ and $O_2$ indicating the highest MSA yields were determined by the concentration of TFAO—OH. MSA percent yields were based on $SO_2$. Reaction conditions: solvent, TFAOH (0.3 mL) and TFAA (0.3 mL); $H_2O_2$ (circle 0.027 mmol, diamond 0.27 mmol); SO$_2$ (0.73 mmol); O$_2$ (0-80 psi, 0.03-0.36 mmol); CH$_4$ (200 psi, 2.8 mmol); temperature (50° C.); time (18 h).

However, the optimal ratio of $SO_2$ and $O_2$ changed when the TFAO-OH concentration was increased from 0.027 mmol (1 mol % $CH_4$) to 0.27 mmol (10 mol % $CH_4$). Similar to the aforementioned experiments, the percent conversion continuously grew until it reached the peak and then diminished (FIG. 3), while more $O_2$ was required for the optimal yield, resulting in a comparatively higher ratio of $O_2$ ($SO_2/O_2=3.7$). This substantial increase in the amount of $O_2$ required to reach the maximum yield suggested the significance of the radical initiator in determining the optimal ratio between $SO_2$ and $O_2$ during methane sulfonation, and the importance of radical species in the initial step generating $TFAOSO_3H$ from $SO_2$ is described in Scheme 3(a).

The application of TFAA was proved to be crucial for the optimal conditions as it could behave as a dehydrating reagent, removing newly generated water during methane sulfonation. Prior to aqueous quenching, the generation of MSA was confirmed by $^1H$ NMR spectral analysis (FIG. 4), implying that the hydrolysis of anhydride products, trifluoroacetic anhydride $TFAOSO_2CH_3$ (7) and methanesulfonic anhydride (MSAA, 10) took place during the reaction. Since the inhibiting effect of water was verified with the decreased yields, addition of an adequate amount of TFAA was necessary to prevent the inhibition.

By adding an inert gas such as $N_2$ to increase the overall pressure of the bomb reactors and the solubility of the gases, we observed a trend towards higher conversion yields for both $SO_2$ and $CH_4$ compared to the reaction conducted without $N_2$. It resulted in percent conversions of around 50% for both gases when they were employed in similar amounts. Furthermore, when methane (26 mol % of $SO_2$) was used as a limiting reagent with the use of additional $N_2$ gas, methane conversion went up to 95% based on methane. In contrast, methane conversion was less than 20% when $SO_2$ was used as a limiting reagent presumably because the overall pressure dropped as the reaction progressed. These results suggested that high pressure would be crucial for the in situ activation of methane and $SO_2$ and the addition of inert gases would maintain high pressure to allow for the complete consumption of either or both reacting gases.

TABLE 1

Comparison between two different radical initiators, hydrogen peroxide and potassium persulfate in methane sulfonation using sulfur dioxide under various temperatures.

| Entry | Radical Initiator | Temperatures (° C.) | MSA (yield %) |
| --- | --- | --- | --- |
| 1 | $H_2O_2$ | 50 | 74.3 |
| 2 | $K_2S_2O_8$ | 50 | 0.1 |
| 3 | $H_2O_2$ | 70 | 66.0 |
| 4 | $K_2S_2O_8$ | 70 | 51.4 |
| 5 | $H_2O_2$ | 100 | 36.6 |
| 6 | $K_2S_2O_8$ | 100 | 50.6 |

Competency of $H_2O_2$ and $K_2S_2O_8$ in methane sulfonation using $SO_2$ was investigated under various temperatures. MSA percent yields were based on $SO_2$. Reaction conditions: solvent, TFAOH (0.3 mL) and TFAA (0.3 mL); $H_2O_2$ or $K_2S_2O_8$ (20 mol % based on $SO_2$, 0.15 mmol); $SO_2$ (40 psi, 0.73 mmol); $O_2$ (30 psi, 0.115 mmol); $CH_4$ (200 psi, 3.3 mmol); time (18 h).

To confirm the radical mechanism of the reaction, additional experiments were conducted without a radical initiator or with a radical scavenger (TEMPO, BHT). In all cases, only negligible amounts of MSA were observed if detected at all. It was a significant decrease in MSA generation compared to the reaction employing typical reaction conditions, indicating the free radical mechanism of this methane sulfonation. After we confirmed the radical characteristic of the reaction, we compared the commonly used $K_2S_2O_8$ with $H_2O_2$ as a radical initiator in the one-pot activation of $SO_2$ and $CH_4$. Under the typical $SO_2$ reaction conditions at 50° C., 74% MSA yield was observed with $H_2O_2$ as the radical initiator (Table 1, entry 1), while only 0.1% yield of MSA was detected when $K_2S_2O_8$ was used (entry 2). However, at temperatures over 70° C., $K_2S_2O_8$ was able to produce MSA, albeit in a slightly lower yield compared to the reaction conducted with $H_2O_2$ (entries 3 and 4). Unlike TFAO-OH induced by $H_2O_2$, $K_2S_2O_8$ would not be able to produce a hydroxyl radical at low temperatures, which is crucial for the generation of $TFAOSO_3H$ from $SO_2$. Due to the lack of hydroxyl radicals at relatively low temperatures, methane sulfonation employing $SO_2$ in the presence of $K_2S_2O_8$ was viable only at high temperatures (entry 6), while higher temperatures caused the decomposition of radical species in methane sulfonation with $H_2O_2$ leading to lower yield (entry 5). Moreover, the generation of the inorganic salt potassium bisulfate ($KHSO_4$) as a byproduct was inevitable when $K_2S_2O_8$ was employed. In contrast, $H_2O_2$ produces water, which only leads to the generation of TFAOH by reacting with TFAA and the production of MSA by hydrolysis of $TFAOSO_2CH_3$. Considering all these factors, TFAO-OH generated from $H_2O_2$ would be the most suitable radical initiator for the intended methane functionalization at low temperatures using $SO_2$ and $O_2$ via trifluoroacetyl sulfuric acid.

Figure 20:
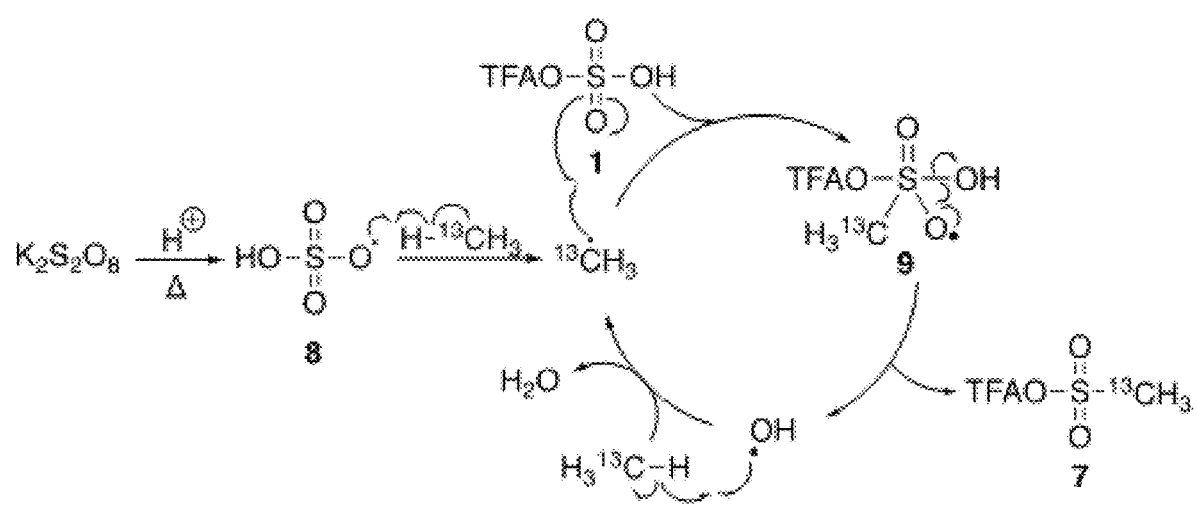
FIG. 20. Scheme 4: Proposed mechanism for methane sulfonation via trifluoroacetyl sulfuric acid (TFAOSO$_3$H, 1) generated from H$_2$SO$_4$.

Scheme 4 (FIG. 20). Proposed mechanism for methane sulfonation via trifluoroacetyl sulfuric acid ($TFAOSO_3H$, 1) generated from $H_2SO_4$.

A free-radical mechanism for methane sulfonation was considered, as depicted in Scheme 4, to account for MSA generation. Sulfate radical 8 generated from a radical initiator, $K_2S_2O_8$, can abstract hydrogen from $CH_4$ and create a methyl radical ($CH_3$). As Singleton addressed $SO_3$ as electrophilic rather than nucleophilic,[15] the methyl radical may undergo nucleophilic radical addition to $TFAOSO_3H$ (1) at the sulfur atom. The resultant methyltrifluoroacetyl sulfate radical complex 9 can spontaneously dissociate to produce methanesulfonyl trifluoroacetic anhydride ($TFAOSO_2CH_3$, 7) and hydroxyl radical (OH), which then reacts with methane to regenerate methyl radical ($CH_3$) and keep the radical chain as the continuous C—H activation cycle.

Previous studies on the radical mechanism by Sen and Bell proposed a direct sulfonation of $CH_3$· on $SO_3$ to afford a methyl sulfate radical ($CH_3SO_3$·) that would propagate the radical chain reaction. Likewise, in our case, methyltrifluoroacetyl sulfate radical 9 ((TFAO)$CH_3S(OH)O_2$·) derived from $TFAOSO_3H$ (1) would be the radical chain carrier to drive the reaction forward. There could be other competing radicals in the reaction solution which may perform hydrogen atom abstraction (HAA). However, according to the bond dissociation energy (BDE) of the similar compound $H_2SO_4$, more energy would be required to break a bond between O—H (133 kcal/mol) in $H_2SO_4$ than to break the C—H bond in $CH_4$ (105 kcal/mol). Moreover, homolytic cleavage between the S—O bond is more feasible than with the O—H bond as the BDE of the O—H bond in $H_2SO_4$ is higher than the BDE of S—OH and S=O bonds, which are 88 and 110 kcal/mol, respectively. Consequently, formation of radical complex 9 would be plausible in the mechanism via the radical pathway.[20]

Figure 21:
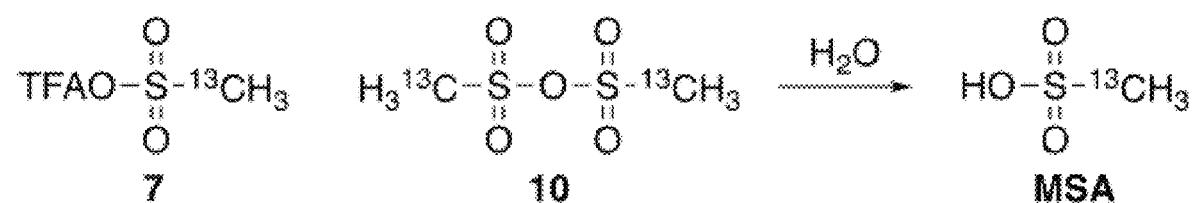
FIG. 21. Scheme 5: Hydrolysis of methanesulfonyl trifluoroacetic anhydride (TFAOSO$_2$CH$_3$, 7) and methanesulfonic anhydride (MSAA, 10) generating methanesulfonic acid (MSA, 1) in the presence of water.

Scheme 5 (FIG. 21). Hydrolysis of methanesulfonyl trifluoroacetic anhydride ($TFAOSO_2CH_3$, 7) and methanesulfonic anhydride (MSAA, 10) generating methanesulfonic acid (MSA, 1) in the presence of water.

Before the reaction was quenched, products were observed in three different forms under equilibrium, although $TFAOSO_2CH_3$ (7) was always the major product and MSA was the minor product. Additionally, trace amounts of methanesulfonic anhydride (MSAA, 10) were detected. In separate experiments, the coupling of TFAA and MSA was confirmed to afford $TFAOSO_2CH_3$ (7) and MSAA (10).[11] Both of these anhydrides (7 and 10) from our sulfonation reactions were smoothly hydrolyzed and converted to MSA upon being quenched with water (Scheme 5). These results implied the generation of water during the reaction, which would result in the conversion of incipient $TFAOSO_2CH_3$ to MSA and the ensuing formation of an equilibrated mixture of products. When we employed reduced amounts of TFAA for the sulfonation reaction, we experienced decreased yields in MSA, whereas the addition of water to the standard conditions led to further reduction in percent yields. Therefore, the use of TFAA was necessary for optimal conditions by removing newly generated water and MSA.

Scheme 6. Decomposition of radical intermediates (TFAO•) generating methanesulfonyl fluoride (MSF) fromMSA.

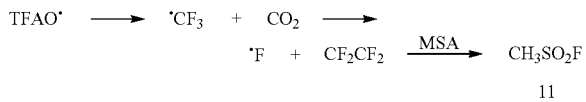

Additionally, decomposition of radical intermediates to produce side products encompassing methanesulfonyl fluoride (MSF) was observed only when the reactions were attempted at high temperatures, and its structure was elucidated out of crude products by $^1H$, $^{13}C$, and $^{19}F$ NMR spectral analysis as both proton-coupled $^{13}C$ and $^{19}F$ NMR exhibited two-bond coupling $^{13}C$—S—F ($J_{C\text{-}F}$=19.7 Hz). As shown in Scheme 6, the trifluoroacetate radical (TFAO) can be generated from various species such as complex 9, $TFAOSO_3H$, or TFAOH at relatively high temperatures and then may decompose into $CO_2$ and traces of trifluoromethyl radical (·$CF_3$),[16] which may undergo thermal decomposition to create $C_2F_4$ and a fluoride radical (F·).[21] F· appeared to react with produced MSA to furnish MSF (11) as a minor product. We verified the conversion of MSA to MSF in separate experiments, where the similar reaction was conducted with MSA as a substitute for $CH_4$. MSF was generated from MSA even in the absence of $TFAOSO_3H$, suggesting the formation of TFAO from the reaction solvent, TFAOH. The conversion of MSA into MSF, however, was observed only when radical initiators including potassium persulfate ($K_2S_2O_8$) were employed, corroborating the radical nature of the MSF generation.

Scheme 7. Regioselective sulfonation method of propane and n-butane by using $SO_2$ and $O_2$.

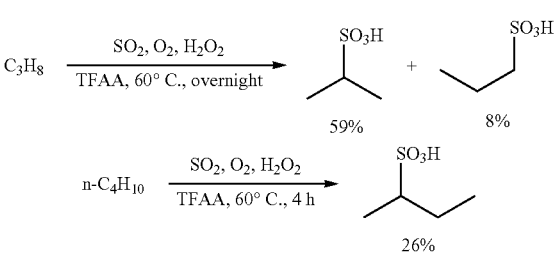

To determine the competency of trifluoroacetyl sulfate radical ((TFAO)CH$_3$S(OH)O$_2$·, 9) as the key intermediate in methane functionalization, another hydrocarbon gas, propane was subjected to the identical sulfonation process as an additional proof to validate the proposed radical pathway (Scheme 7). When the propane gas was added to the reaction mixture of SO$_2$, O$_2$, and 20 mol % H$_2$O$_2$ in the TFAOH/TFAA solution, 59% of 2-propanesulfonic acid and 8% of 1-propanesulfonic acid were observed based on the initial amount of propane. These conditions for propane effected sulfonation predominantly and exhibited the high regioselectivity where the methylene center had a 23-fold increase in functionalization than the methyl carbons via a more stable secondary carbon centered radical than the primary radical. Further optimization of reaction conditions for propane improved the yields of the sulfonation reaction. Specifically, when 1 mol % H$_2$O$_2$ in the TFAOH/TFAA solution, 73% for 2-propanesulfonic acid and 7% for 1-propanesulfonic acid yields were achieved.

In another example, n-butane was sulfonated using similar reactions conditions, affording a 26% yield of 2-butanesulfonic acid.

TABLE 2

Methane sulfonation via TFAOSO$_3$H under various conditions.[a]

| Entry | Initiator | MSA (yield, %)[b] | $^{13}$CH$_4$ Conv. (%) |
|---|---|---|---|
| 1 | 9.5 mol % K$_2$S$_2$O$_8$ | 94.1 | 86.0 |
| 2 | 0.95 mol % K$_2$S$_2$O$_8$ | 37.7 | 34.5 |
| 3 | 0.95 mol % H$_2$O$_2$ | 30.1 | 27.6 |
| 4 | — | 0.02 | 0.02 |
| 5 | 0.95 mol % K$_2$S$_2$O$_8$ with O$_2$ | 1.8 | 1.8 |

Under various conditions with different concentrations of K$_2$S$_2$O$_8$, competency of TFAOSO$_3$H was determined. [a]Reaction conditions: Solvent, TFAOH:TFAA:TFAOSO$_3$H=1:1:1 (0.98 mL, 2.84 mmol); radical initiator K$_2$S$_2$O$_8$ (0.95-9.5 mol % based on TFAOSO$_3$H, 0.027-0.27 mmol); $^{13}$CH$_4$ (400 psi, 3.1 mmol); temperature (50° C.); time (18 h). [b]The percent yield of MSA was calculated based on the initial amount of TFAOSO$_3$H.

We varied the reaction conditions to further prove the mechanism, clearly understand the reaction pathways in comparison with known methods, and develop optimal conditions (Table 2). When we employed potassium persulfate, K$_2$S$_2$O$_8$, a radical initiator, which was extensively studied in previous CH$_4$ sulfonation studies, the optimal conditions of 9.5 mol % of K$_2$S$_2$O$_8$ afforded MSA in 94% yield based on TFAOSO$_3$H (Table 2, entry 1), whereas a reduced amount of product was obtained when a smaller amount of initiator was used (entry 2). The results were similar to the reactions with H$_2$O$_2$ (entry 3). Compared to K$_2$S$_2$O$_8$ used in mechanistic and optimization studies, a parallel trend was witnessed in the reactions with H$_2$O$_2$ as an initiator only with the marginally reduced yields, which indicated that both radical initiators facilitated the same mechanistic pathway. Other than K$_2$S$_2$O$_8$ and H$_2$O$_2$, however, known radical generators were not as efficient. When NBS, AIBN, and tert-butylhydroperoxide were employed as a substitute of K$_2$S$_2$O$_8$, none was able to furnish MSA derivatives or functionalize methane.

TABLE 3

Kinetic isotope effect studies: Analysis on $k_H/k_D$.[a]

| Entry | Time (min) | CH$_3$SO$_3$H (yield, %)[b] | CD$_3$SO$_3$H (yield, %)[b] | $k_H/k_D$ |
|---|---|---|---|---|
| 1 | 5 | 1.65 | 0.72 | 2.29 |
| 2 | 10 | 5.13 | 2.77 | 1.85 |
| 3 | 20 | 9.54 | 7.99 | 1.19 |

[a]Reaction conditions: Solvent, TFAOH:TFAA:TFAOSO$_3$H = 1:1:1 (0.49 mL, 1.42 mmol); radical initiator K$_2$S$_2$O$_8$ (0.98 mol % based on TFAOSO$_3$H, 0.014 mmol); CH$_4$ or CD$_4$ (20 psi, 1.84 mmol); temperature (50° C.).
[b]The percent yield of MSA was calculated based on the initial amount of gas (CH$_4$ or CD$_4$).

In accordance with typical radical reactions, eliminating the radical initiator from the reaction conditions prevented the formation of MSA or any $^{13}$C-labeled products (entry 4), corroborating that $^{13}$CH$_4$ would be activated via a radical mechanism. This radical pathway was almost shut down upon addition of O$_2$ to the reaction mixture containing K$_2$S$_2$O$_8$, presumably due to radical inhibition by molecular oxygen (entry 5). In this case, $^{13}$CH$_4$ was transformed to MSA only in a 1.8% yield. In addition to oxygen, NBS and AIBN behaved as radical inhibitors when they were used with equimolar amounts of K$_2$S$_2$O$_8$, resulting in only 1% of MSA. When an equimolar amount of radical scavenger, TEMPO[22] or BHT, was added to the typical reaction condition containing 0.95 mol % of K$_2$S$_2$O$_8$, a drastic decrease in the percent yield was observed. As a result, experimental results from the mechanistic studies established the significance of radical species in methane functionalization via TFAOSO$_3$H. Furthermore, the involvement of C—H activation in this radical pathway was investigated with a kinetic isotope effect by analyzing the percent yield of sulfonated products from nonisotopically labeled methane (CH$_4$) and deuterated methane (CD$_4$).[23] Corresponding ratios of $k_H/k_D$ demonstrated the deuterium isotope effect and provided an additional proof for C—H activation of methane (Table 3).

Figure 5A:
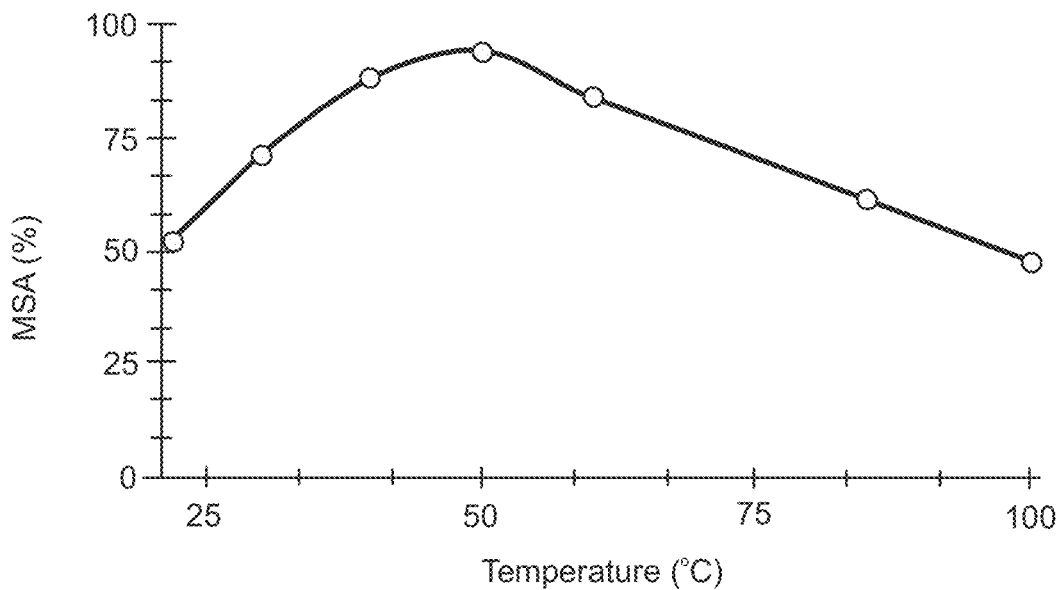
FIGS. 5A and 5B. Effects of reaction conditions on the conversion of TFAOSO$_3$H to MSA. MSA yields were plotted under different conditions varying (A) temperature, and (B) amount of the initiator (K$_2$S$_2$O$_8$) with two different temperatures (diamond, 50° C.; star, 100° C.). Reaction conditions: solvent, TFAOH/TFAA/TFAOSO$_3$H=1:1:1 (0.98 mL, 2.84 mmol); radical initiator K$_2$S$_2$O$_8$: (A) 9.5 mol % based on TFAOSO$_3$H, 0.27 mmol; (B) 0.5-15.5 mol %, 0.014-0.44 mmol; $^{13}$CH$_4$ (400 psi, 3.1 mmol); time (18 h).
Figure 5B:
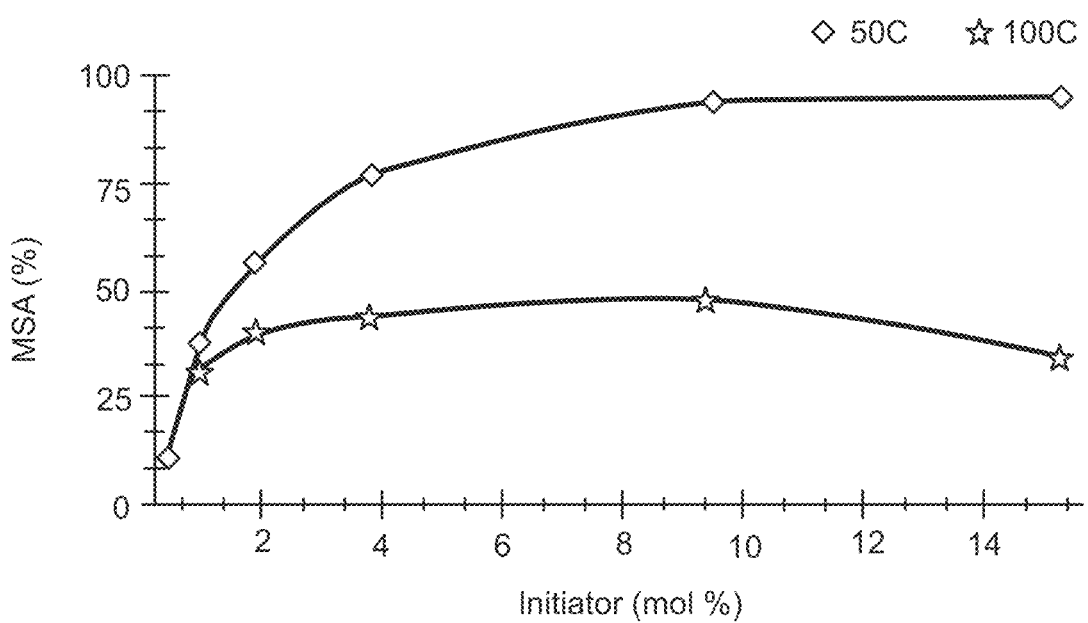
Figure 6A:
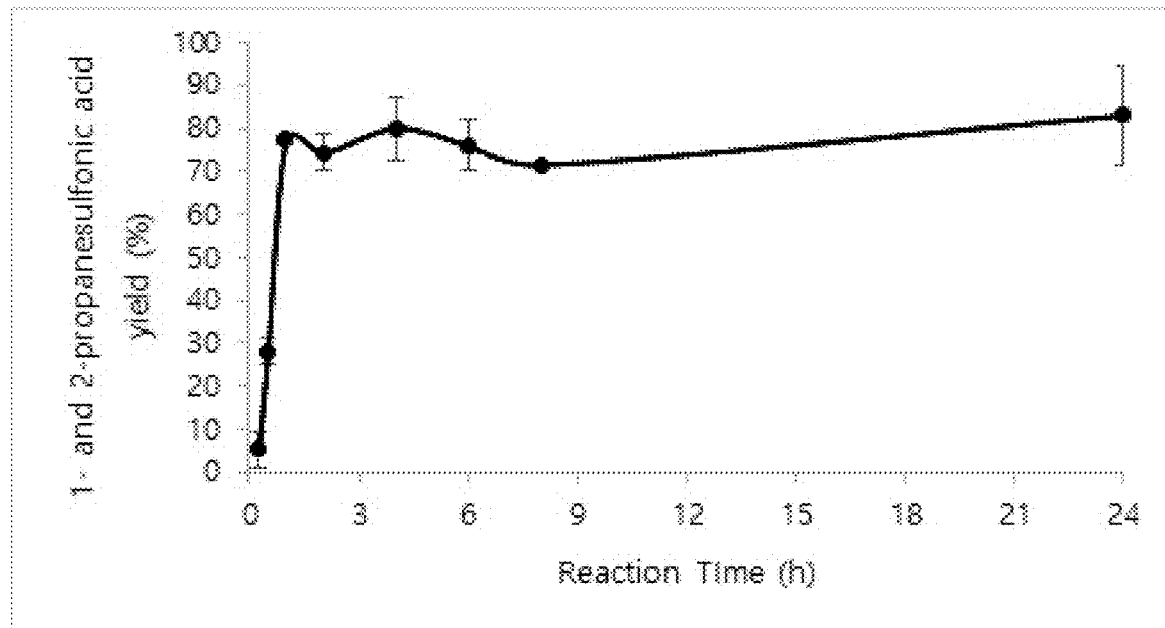
FIGS. 6A, 6B, 6C, and 6D. Effects of propane reaction conditions on the percent yield of propanesulfonic acids.
Figure 6B:
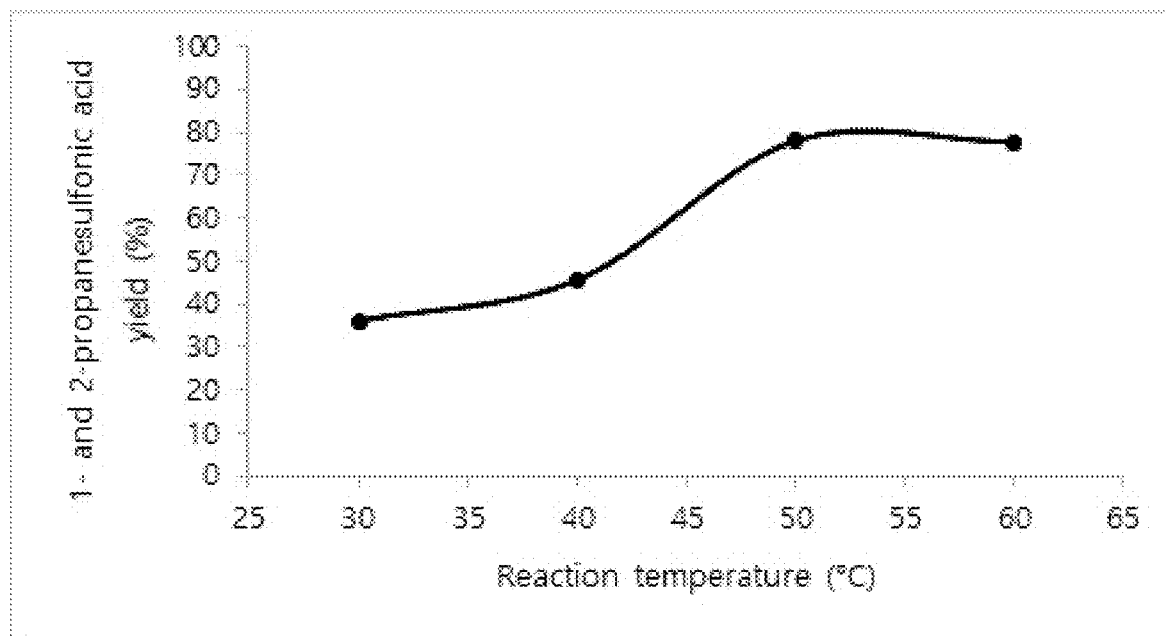
Figure 6C:
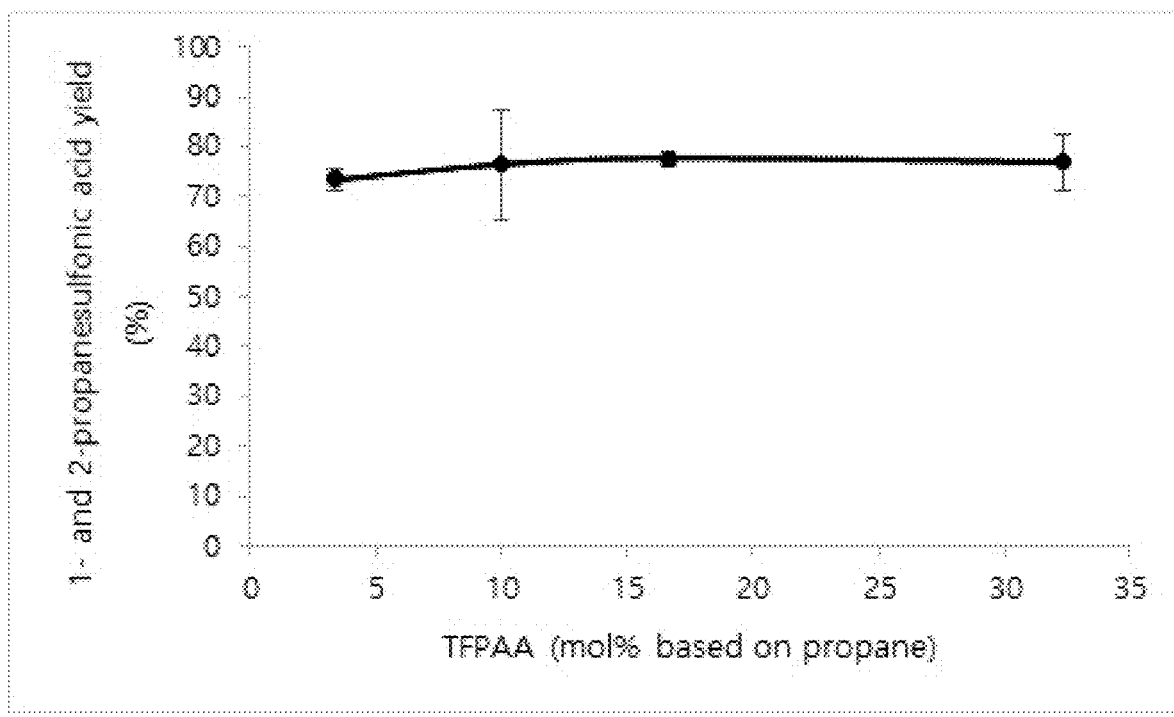
Figure 6D:
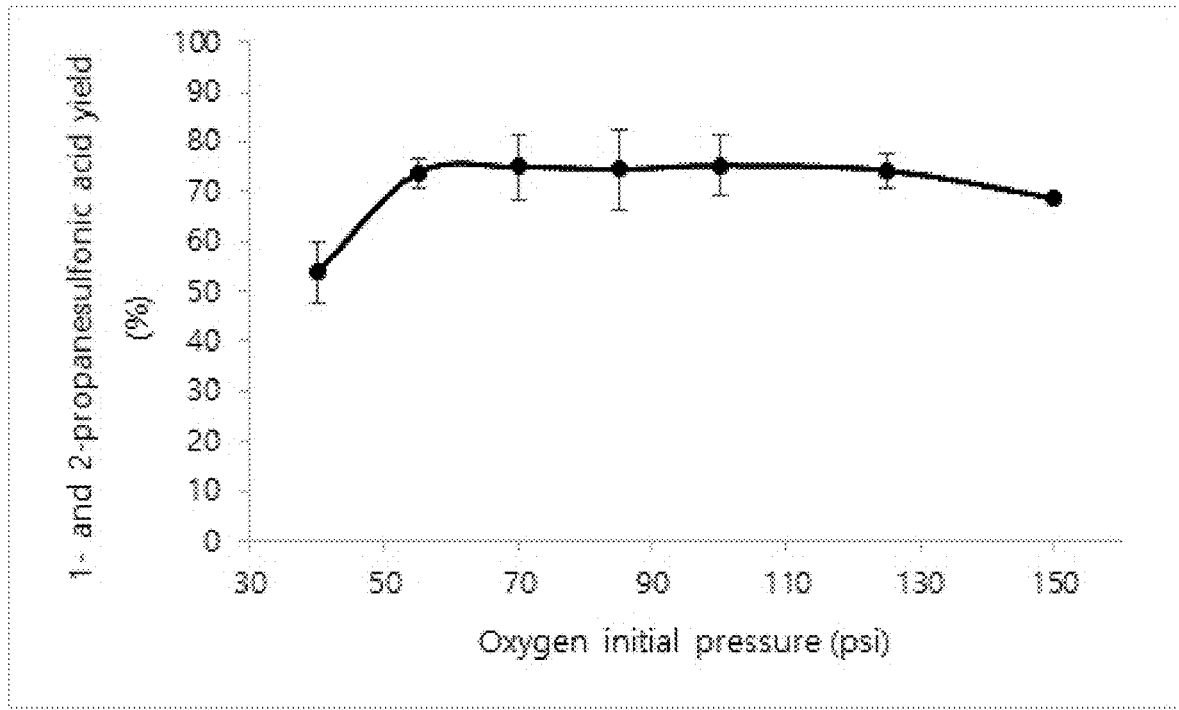

We extended mechanistic studies to optimize the reaction conditions, as described in FIG. 5, where the effects of temperature, initiator concentration, and reaction times were investigated. Out of various attempted reaction temperatures, higher MSA yields were obtained at relatively lower temperatures, with the highest yield and selectivity observed at 50° C. (FIG. 5A). When the temperatures were increased gradually, yields of MSA increased in parallel up to 50° C. and then decreased sharply. As the concentration of the initiator increased at 50° C. (FIG. 5B, gold diamond), the percent conversion improved proportionally up to 9.5 mol % of the initiator K$_2$S$_2$O$_8$. A further increase of the initiator did not lead to a significant increase in product formation, demonstrating the typical pattern of radical-initiated reactions. At high temperatures, the decrease of MSA formation was noticed with excess initiator over 9.5 mol % (FIG. 5B, blue star, 100° C.). These results align with the generation of MSF, which would be caused by the thermal decomposition of radical intermediates reacting with MSA.

Typical reactions were done in 18 h; however, most progress was exhibited within 8 h, and only a minor increase in MSA formation was observed after 8 h. Additionally, 84% of their maximum yields were reached in 2 h. When H$_2$SO$_4$ and oleum (fuming sulfuric acid, 20% SO$_3$) were further examined for their suitability as a reactant for methane sulfonation, both reactants were converted to MSA in 77 and 81% yields, respectively, based on the added sulfur sources. It was clear that the reactions produced compelling percent yields; however, presynthesized TFAOSO$_3$H transpired as the most effective reactant. Another intriguing feature we discovered was the feasibility of the sulfonation of methane gas not only in pressurized reactors (400 psi of $^{13}CH_4$) but also in glass flasks (1 atm of $^{13}CH_4$). When the sulfonation was run under 1 atm of methane with 9.5 mol % of $K_2S_2O_8$, the reaction smoothly afforded MSA with 14% conversion of preprepared $TFAOSO_3H$, suggesting the potential for a large-scale reaction for practical use by adopting continuous flow techniques, which will be reported in due course.

In comparison, the reaction conditions for propane, including $H_2O_2$ amounts, temperature, reaction time, and $O_2$ amounts were also optimized, as shown in FIG. 6. In optimizing reaction times, the reaction yield achieved a plateau at 77% after 1 hour, which is much faster than the methane reactions, illustrating the relative inertness of methane. Next, temperature was varied between 30-60° C. Reaction yields increased as temperature was increased, reaching a plateau at 78% at 50-60° C. Similar to methane, propane sulfonation proceeded even at lower temperatures, albeit with lower yields. Finally, $H_2O_2$, which generated the radical initiator, TFPAA, upon contact with TFAA, was then tested at 3-30 mol % based on propane, the limiting reagent. Reaction yields remained rather stable through the initiator concentration range, demonstrating the efficient catalytic activity of TFPAA. In summary, propane sulfonation can be achieved regioselectively, rapidly and efficiently with low initiator loading ($H_2O_2$, 1 mol % relative to $SO_2$) at 50° C. in 1 hour.

CONCLUSION

Reported herein is the coupling of the three gaseous components methane, sulfur dioxide, and molecular oxygen to efficiently produce methanesulfonic acid (MSA) under mild conditions. Trifluoroacetylsulfuric acid ($TFAOSO_3H$), a key intermediate for methane functionalization, was successfully generated from sulfur dioxide and molecular oxygen under radical conditions and then reacted with methane to produce MSA efficiently. Sulfur dioxide and methane were converted to MSA in comparatively high yields at temperatures as low as 50° C. without requiring much energy. Furthermore, when methane was employed as a limiting reagent, near-complete consumption of methane was observed. These one-pot two-step procedures for converting two harmful gases, $CH_4$ and $SO_2$, into a transportable and valuable liquid, MSA, would contribute to the broad efforts in tackling environmental issues.

Supplemental Information

Materials and Methods

Prior to the reaction, all glassware and reactors were dried in an oven. All chemicals were purchased from commercial providers and used without further purification.

NMR spectra were recorded on either a Varian Mercury 400 2-Channel NMR Spectrometer or a Varian VNMRS-500 2-Channel NMR spectrometer. Acetonitrile ($CH_3CN$) and 3-(Trimethylsilyl)propionic-2,2,3,3-$d_4$ acid sodium salt (TMSP-$d_4$) were used as internal references for $^1H$ NMR, and trifluoroacetic acid (TFAOH) was used as an internal reference for $^{13}C$ and $^{19}F$ NMR spectra. The chemical shifts are reported in δ (ppm) values with the $^1H$ NMR reference of TMSP-$d_4$ signal (δ 0 ppm) and coupling constants (J) are reported in hertz (Hz). For $^{13}C$ NMR and $^{19}F$ NMR, chemical shifts were referenced to TFAOH (δ 116.6 ppm for $^{13}C$ NMR and δ −76.55 ppm for $^{19}F$ NMR).

1.1 General Procedure for Methane Sulfonation Using $SO_2$. (Tables S1-S7)

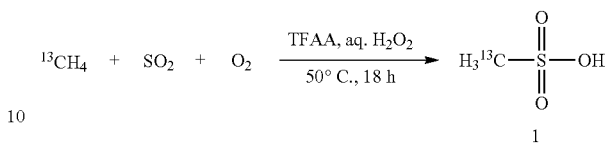

A radical initiator, $H_2O_2$, was added to an oven-dried 0.5 dram vial containing 0.3 mL of TFAOH and TFAA each. The reaction mixture in a closed stainless-steel reactor was cooled down to −78° C. in a dry ice bath, and charged with $SO_2$, $O_2$, and $CH_4$. The mixture was stirred at 50-60° C. for 18 hours. After quenching with $D_2O$, $^1H$ NMR and $^{13}C$ NMR spectra were recorded $CH_3CN$ and TMSP-$d_4$ as internal references. The percent yield of methanesulfonic acid (MSA) was calculated based on the initial amount of $SO_2$. $CH_4$ conversion (Conv.) was calculated based on the initial amount of $CH_4$. On $^1H$ NMR (400 MHz, $D_2O$), $^{13}$MSA was observed at δ 2.89 ppm (d, $J_{C-H}$=136.4 Hz).

TABLE S1

Methane sulfonation by using $SO_2$ and $O_2$.[a]

| Entry | Temperature (° C.) | $H_2O_2$ (mol %) | MSA (yield %)[b] | Conv. (%, $CH_4$) |
|---|---|---|---|---|
| 1 | 50 | 15 | 67.6 | 15.0 |
| 2 | 50 | 20 | 74.3 | 16.5 |
| 3 | 60 | 15 | 73.1 | 12.9 |
| 4 | 60 | 20 | 75.2 | 18.5 |

Methane sulfonation was successfully conducted with $SO_2$ and $O_2$ resulting in high yields around 75% at low temperatures. [a]Reaction conditions: solvent, TFAOH (0.3 mL) and TFAA (0.3 mL); $H_2O_2$ (15-20 mol % based on $SO_2$, 0.11-0.15 mmol); $SO_2$ (40 psi, 0.73 mmol); $O_2$ (30 psi, 0.12 mmol); $CH_4$ (200 psi, 3-3.3 mmol); time (18 h). [b]The percent yield of MSA was calculated based on $SO_2$.

TABLE S2

Time study.[a]

| Entry | Time (h) | MSA (yield %)[b] | Conv. (%, $CH_4$) |
|---|---|---|---|
| 1 | 2 | 36.6 | 17.0 |
| 2 | 4 | 37.9 | 17.7 |
| 3 | 6 | 38.7 | 18.0 |
| 4 | 8 | 40.0 | 18.6 |
| 5 | 18 | 40.1 | 18.7 |

Time study was conducted for the methane sulfonation. [a]Reaction conditions: Solvent, TFAA (0.6 mL); $H_2O_2$ (21 mol % based on $SO_2$, 0.27 mmol); $SO_2$ (80 psi, 1.3 mmol); $O_2$ (50 psi, 0.2 mmol); $CH_4$ (200 psi, 2.8 mmol); temperature (50° C.). [b]The percent yield of MSA was calculated based on $SO_2$.

TABLE S3

Optimal ratio between sulfur dioxide and molecular oxygen during methane sulfonation conducted with 0.27 mmol trifluoroperacetic acid.[a]

| | Entry | | |
|---|---|---|---|
| | 1<br>0.73 mmol SO$_2$ | 2<br>1.3 mmol SO$_2$ | 3<br>1.9 mmol SO$_2$ |
| No O$_2$ | 9.7% | 5.6% | 3.4% |
| 20 psi O$_2$<br>(0.07 mmol) | 38% | 19% | 11% |
| 30 psi O$_2$<br>(0.12 mmol) | 54% | 27% | 18% |
| 50 psi O$_2$<br>(0.20 mmol) | 64% | 40% | 26% |
| 80 psi O$_2$<br>(0.36 mmol) | 31% | 46% | 46% |

Under various concentrations of SO$_2$ and O$_2$, the optimal ratio between SO$_2$ and O$_2$ exhibiting a highest MSA percent yield was determined when 0.27 mmol of TFAO—OH was employed (SO$_2$/O$_2$=3.7). MSA yield was calculated based on SO$_2$ added. [a]Reaction conditions: solvent, TFAOH (0.3 mL) and TFAA (0.3 mL); H$_2$O$_2$ (0.27 mmol); CH$_4$ (200 psi, 3 mmol); temperature (50° C.); time (18 h). [b]The percent yield of MSA was calculated based on SO$_2$.

TABLE S4

Effects of anhydrous condition with the use of TFAA.[a]

| Entry | H$_2$O$_2$<br>(mol %) | Reaction solution | MSA<br>(yield %)[b] |
|---|---|---|---|
| 1 | 20 | Absence of TFAA<br>(TFAOH only as a solvent) | 32.8 |
| 2[a] | 20 | Application of additional<br>2 μL of water | 6.8 |

The reaction was conducted 1) without TFAA in the reaction mixture after the addition of H$_2$O$_2$, and 2) with additional 2 μL of water in the absence of TFAA to figure out the effects of anhydrous condition in methane sulfonation. [a]Reaction conditions: solvent, TFAA (0.122 mL); H$_2$O$_2$ (20 mol % based on SO$_2$, 0.15 mmol); SO$_2$ (40 psi, 0.73 mmol); O$_2$ (30 psi, 0.12 mmol); CH$_4$ (200 psi, 3 mmol); temperature (50° C.); time (18 h); [a]Additional water was applied to the reaction mixture (0.002 mL, 0.11 mmol). [b]The percent yield of MSA was calculated based on SO$_2$.

TABLE S5

Effects of higher pressure in methane sulfonation.[a]

| Entry | H$_2$O$_2$<br>(mol %) | Final pressure (psi) | MSA<br>(yield %)[b] | Conv.<br>(%, CH$_4$) |
|---|---|---|---|---|
| 1 | 15 | 58 psi with CH$_4$ | 33.0 | 45.2 |
| 2 | 20 | 59 psi with CH$_4$ | 33.1 | 46.2 |
| 3 | 15 | 400 psi with N$_2$ | 48.7 | 56.0 |
| 4 | 20 | 420 psi with N$_2$ | 47.3 | 54.5 |

By adding N$_2$ gas after charging with SO$_2$, O$_2$, and CH$_4$, the sulfonation of methane was conducted under higher pressure. [a]Reaction conditions: solvent, TFAOH (0.3 mL) and TFAA (0.3 mL); H$_2$O$_2$ (15-20 mol % based on SO$_2$, 0.11-0.15 mmol); SO$_2$ (40 psi, 0.73 mmol); O$_2$ (30 psi, 0.1 mmol for entry 1-2; 0.04 mmol for entry 3-4); CH$_4$ (0.5-0.6 mmol); N$_2$ (~ 400 psi); temperature (50° C.); time (18 h). [b]The percent yield of MSA was calculated based on SO$_2$.

TABLE S6

High methane conversion yields.[a]

| Entry | H$_2$O$_2$<br>(mol %) | N$_2$<br>(psi) | MSA<br>(yield %)[b] | Conv.<br>(%, CH$_4$) |
|---|---|---|---|---|
| 1 | 15 | 230 | 23.2 | 93.6 |
| 2 | 20 | 210 | 24.5 | 94.6 |

With the help of additional N$_2$, methane conversion yields increased up to 95% when CH$_4$ was employed as a limiting reagent. [a]Reaction conditions: solvent, TFAOH (0.3 mL) and TFAA (0.3 mL); H$_2$O$_2$ (20 mol % based on SO$_2$, 0.15 mmol); SO$_2$ (40 psi, 0.73 mmol); O$_2$ (30 psi, 0.04 mmol); CH$_4$ (0.18-0.19 mmol); N$_2$ (~230 psi); temperature (50° C.); time (18 h). [b]The percent yield of MSA was calculated based on SO$_2$.

TABLE S7

Confirmation of free radical mechanism of the methane sulfonation using radical scavenger.[a]

| Entry | H$_2$O$_2$<br>(mol %) | Radical Scavenger | MSA<br>(yield %)[b] | Conv.<br>(%, CH$_4$) |
|---|---|---|---|---|
| 1 | 20 | — | 74.3 | 16.5 |
| 2 | — | — | 0 | 0 |
| 3 | 20 | 20 mol % TEMPO | 3.3 | 0.7 |
| 4 | 20 | 20 mol % BHT | 0 | 0 |

[a]Reaction conditions: solvent, TFAOH (0.3 mL) and TFAA (0.3 mL); H$_2$O$_2$ (20 mol % based on SO$_2$, 0.15 mmol); SO$_2$ (40 psi, 0.73 mmol); O$_2$ (30 psi, 0.12 mmol); CH$_4$ (200 psi, 3-3.3 mmol); time (18 h). [b]The percent yield of MSA was calculated based on SO$_2$.

1.2. General Procedure for Propane Sulfonation (Table S8)

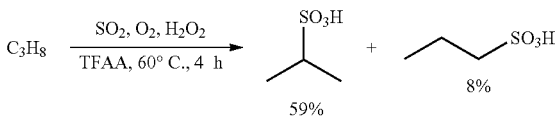

In a closed stainless-steel reactor, a reaction mixture having H$_2$O$_2$, TFAOH, and TFAA was cooled down to −78° C. in the dry ice bath. After charging with SO$_2$, C$_3$H$_8$, O$_2$, and N$_2$, the mixture was stirred at 60° C. for 4 hours. After quenching with CD$_3$OD, $^1$H NMR was taken using CH$_3$CN as an internal reference. Percent yield of propanesulfonic acid was calculated based on the initial amount of SO$_2$ and C$_3$H$_8$. Conversion (Conv.) was calculated based on the initial amount of C$_3$H$_8$. 1-propanesulfonic acid $^1$H NMR (400 MHz, D$_2$O), δ 2.80 ppm (t, J=7.9 Hz, 2H), 1.72 ppm (m, 2H), 0.92 ppm (t, J=7.5 Hz, 3H).

2-propanesulfonic acid $^1$H NMR (400 MHz, D$_2$O), δ 2.95 ppm (hep, J=6.9 Hz, 1H), 1.22 ppm (d, J=6.8 Hz, 6H).

TABLE S8

Regioselective propane sulfonation by using $SO_2$ and $O_2$ at low temperature.

| Entry | H2O2 (mol %) | 1-propanesulfonic acid:2propanesulfonic acid (%, $SO_2$) | Conv. 1-propanesulfonic acid:2propanesulfonic acid (%, propane) |
|---|---|---|---|
| 1 | 20 | 4.95%:38.51% | 7.59%:59.01% |

At low temperature, propane was effectively sulfonated by using $SO_2$ and $O_2$. Reaction conditions: Solvent, TFAA (0.465 mL); $H_2O_2$ (20 mol % based on $SO_2$, 0.15 mmol); $SO_2$ (40 psi, 0.73 mmol); $O_2$ (38 psi, 0.024 mmol); propane (29 psi, 0.47 mmol); $N_2$ (400 psi); temperature (60° C.); time (4 h).

1.3. General Procedure for Sulfonation of Methane with the Use of Pre-synthesized TFAOSO$_3$H. (Table S9-S15)

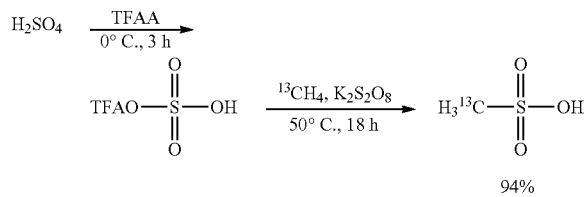

94%

TFAOSO$_3$H was prepared based on the previously reported method of mixing 1:2.1 mol ratio of $H_2SO_4$ and TFAA in ice-bath for 3 hours. Then, in a closed stainless-steel reactor, a radical initiator was added to a reaction mixture of 1:1:1 of TFAOSO$_3$H, TFAOH, and TFAA. After charging with $^{13}CH_4$, the mixture was stirred at 50° C. for 18 hours. After quenching with $D_2O$, $^1H$ NMR and $^{13}C$ NMR were taken using $CH_3CN$ and TMSP-d$_4$ as internal references. Percent yield of MSA was calculated based on the initial amount of $SO_2$. $^{13}CH_4$ conversion (Conv.) was calculated based on the initial amount of $^{13}CH_4$.

$^{13}$MSA $^1H$ NMR (400 MHz, $D_2O$), δ 2.89 ppm (d, $J_{C-H}$=136.4 Hz); $^{13}C$ NMR (126 MHz, $D_2O$), δ 40.0 ppm (q, $J_{C-H}$=136.7 Hz).

$^{13}$MSF $^1H$ NMR (400 MHz, $D_2O$), δ 3.42 ppm (dd, $J_{C-H}$=142.2 Hz, J=5.7 Hz); $^{13}C$ NMR (126 MHz, $D_2O$), δ 37.5 ppm (qd, $J_{C-H}$=142.3 Hz, $J_{C-F}$=19.7 Hz); $^{19}F$ NMR (470 MHz, $D_2O$), δ 59.1 ppm (dq, $J_{C-F}$=19.7 Hz, $J_{F-H}$=5.8 Hz).

TABLE S9

Effect of TFAA in methane sulfonation.[a]

| Entry | Reaction solution | MSA (yield, %)[c] |
|---|---|---|
| 1 | Absence of TFAA | 25.6 |
| 2[b] | Addition of 2 μL of water | 18.7 |

To evaluate the significance of TFAA in the reaction solution, 1) reduced amount of TFAA, and 2) additional water was applied to the standard condition. [a]Reaction conditions: Solvent, TFAOH:TFAOSO$_3$H=1:1 (0.566 mL, 2.84 mmol); TFAOH (0.414 mL); radical initiator $K_2S_2O_8$ (0.95 mol % based on TFAOSO$_3$H, 0.027 mmol); $^{13}CH_4$ (400 psi, 3.1 mmol); temperature (50° C.); time (18 h). [b]2 μL of water was added to the reaction solution. [c]The percent yield of MSA was calculated based on the initial amount of TFAOSO$_3$H.

TABLE S10

Mesyl Fluoride (MSF) generation under various concentrations of $K_2S_2O_8$ in methane sulfonation reaction at high temperature.[a]

| Entry | $K_2S_2O_8$ (mol %) | MSF (yield, %)[b] |
|---|---|---|
| 1 | 0.95 | 1.3 |
| 2 | 1.88 | 2.1 |
| 3 | 3.76 | 4.1 |
| 4 | 5.64 | 4.8 |
| 5 | 7.52 | 7.3 |
| 6 | 9.4 | 6.7 |
| 7 | 11.28 | 6.8 |
| 8 | 15.5 | 8.9 |

At high temperature, MSF was generated depending on the concentration of $K_2S_2O_8$. [a]Reaction conditions: Solvent, TFAOH:TFAA:TFAOSO$_3$H=1:1:1 (0.98 mL, 2.84 mmol); radical initiator $K_2S_2O_8$ (0.95-15.5 mol % based on TFAOSO$_3$H, 0.027-0.44 mmol); $^{13}CH_4$ (400 psi, 3.1 mmol); temperature (100° C.); time (18 h). [b]The percent yield of MSF was calculated based on the initial amount of TFAOSO$_3$H.

TABLE S11

Incompetent radical generator for methane sulfonation via TFAOSO$_3$H.[a]

| Entry | Initiator | MSA (yield, %)[b] | $^{13}CH_4$ Conv. (%) |
|---|---|---|---|
| 1 | 0.95 mol % NBS | — | — |
| 2 | 0.95 mol % AIBN | 0.1 | 0.1 |
| 3 | 0.95 mol % tert-butylhydroperoxide | — | — |

Other known radical generators including NBS, AIBN, and tert-butylhydroperoxide were not able to produce significant amount of MSA in methane sulfonation via TFAOSO$_3$H. [a]Reaction conditions: Solvent, TFAOH:TFAA:TFAOSO$_3$H=1:1:1 (0.98 mL, 2.84 mmol); radical initiator $K_2S_2O_8$ (0.95 mol % based on TFAOSO$_3$H, 0.027 mmol); $^{13}CH_4$ (400 psi, 3.1 mmol); temperature (50° C.); time (18 h). [b]The percent yield of MSA was calculated based on the initial amount of TFAOSO$_3$H.

TABLE S12

Inhibitory effect of the known radical generators (NBS and AIBN) in methane functionalization in the presence of $K_2S_2O_8$ as an radical initiator.[a]

| Entry | Radical Initiator | MSA (yield, %)[b] |
|---|---|---|
| 1 | 0.95 mol % NBS with 0.95 mol % $K_2S_2O_8$ | 0.4 |
| 2 | 0.95 mol % AIBN with 0.95 mol % $K_2S_2O_8$ | 1.2 |

When other known radical generators were employed in the presence of $K_2S_2O_8$, drastic decrease in percent yields in methane functionalization was detected, showing the inhibitory effect in the radical pathway. [a]Reaction conditions: Solvent, TFAOH:TFAA:TFAOSO$_3$H=1:1:1 (0.98 mL, 2.84 mmol); NBS and AIBN (equimolar amount of $K_2S_2O_8$, 0.95 mol % based on TFAOSO$_3$H, 0.027 mmol); radical initiator $K_2S_2O_8$ (0.95 mol % based on TFAOSO$_3$H, 0.027 mmol); $^{13}CH_4$ (400 psi, 3.1 mmol); temperature (50° C.); time (18 h). [b]The percent yield of MSA was calculated based on the initial amount of TFAOSO$_3$H.

TABLE S13

Radical quenching process.[a]

| Entry | Radical Scavenger | MSA (yield, %)[b] |
|---|---|---|
| 1 | TEMPO | 1.8 |
| 2 | BHT | — |

When the radical scavenger (TEMPO or BHT) was added to the standard conditions, we observed decreased yields in MSA. [a]Reaction conditions: Solvent, TFAOH:TFAA:TFAOSO$_3$H=1:1:1 (0.98 mL, 2.84 mmol); radical initiator $K_2S_2O_8$ (0.95 mol % based on TFAOSO$_3$H, 0.027 mmol); radical scavenger TEMPO or BHT (0.027 mmol); $^{13}CH_4$ (400 psi, 3.1 mmol); temperature (50° C.); time (18 h). [b]The percent yield of MSA was calculated based on the initial amount of TFAOSO$_3$H.

TABLE S14

Effects of time in methane sulfonation by using TFAOSO$_3$H.[a]

| Entry | Time (h) | MSA (yield, %)[b] | $^{13}CH_4$ Conv. (%)[c] |
|---|---|---|---|
| 1 | 2 | 79.4 | 72.6 |
| 2 | 4 | 88.1 | 80.5 |
| 3 | 8 | 94.0 | 86.0 |
| 4 | 18 | 94.1 | 86.0 |

Time study was conducted for the methane sulfonation using TFAOSO$_3$H. [a]Reaction conditions: Solvent, TFAOH:TFAA:TFAOSO$_3$H=1:1:1 (0.98 mL, 2.84 mmol); radical initiator $K_2S_2O_8$ (9.5 mol % based on TFAOSO$_3$H, 0.27 mmol); $^{13}CH_4$ (400 psi, 3.1 mmol); temperature (50° C.). [b]The percent yield of MSA was calculated based on the initial amount of TFAOSO$_3$H. [c]$^{13}CH_4$ conversion (Conv.) was calculated based on the initial amount of $^{13}CH_4$.

TABLE S15

$H_2SO_4$ and Oleum as a substitute for TFAOSO$_3$H.[a]

| Entry | Reactant | MSA (yield, %)[b] | $^{13}CH_4$ Conv. (%)[c] |
|---|---|---|---|
| 1 | $H_2SO_4$ | 77.1 | 70.5 |
| 2 | Oleum (fuming sulfuric acid, 20% $SO_3$) | 80.9 | 74.0 |

$H_2SO_4$ and oleum (fuming sulfuric acid, 20% $SO_3$) were investigated for their suitability as a reactant for methane sulfonation. [a]Reaction conditions: Reactant, $H_2SO_4$ or oleum (2.84 mmol); Solvent (TFAOH:TFAA); radical initiator $K_2S_2O_8$ (9.5 mol % based on the reactant, 0.27 mmol); $^{13}CH_4$ (400 psi, 3.1 mmol); temperature (50° C.). [b]The percent yield of MSA was calculated based on the initial amount of reactant. [c]$^{13}CH_4$ conversion (Conv.) was calculated based on the initial amount of $^{13}CH_4$.

1.4 Reaction Optimization for Propane Sulfonation with $SO_2$

Effects of reaction time were first studied. In a closed stainless-steel reactor, a reaction mixture having $H_2O_2$ (0.0013 mL, 30% aqueous solution, 1 mol % based on $SO_2$), TFAOH (0.588 mL), and TFAA (0.0107 mL) was cooled down to −78° C. in a dry ice bath. After charging with $SO_2$ (40 psi twice, 1.46 mmol), $C_3H_8$ (30 psi, 0.55 mmol), $O_2$ (70 psi initial, 0.43 mmol), the mixture was stirred at 60° C. for varying amounts of time. After quenching with $D_2O$, $^1H$ NMR was taken using $CH_3CN$ and TMSP-$d_4$ as internal standards for referencing and quantification. Percent yield of propanesulfonic acids were calculated based on $C_3H_8$. Results were plotted in FIG. 6A.

Effects of reaction temperature were then studied. In a closed stainless-steel reactor, a reaction mixture having $H_2O_2$ (0.0067 mL, 30% aqueous solution, 5 mol % based on $SO_2$), TFAOH (0.540 mL), and TFAA (0.053 mL) was cooled down to −78° C. in a dry ice bath. After charging with $SO_2$ (40 psi twice, 1.46 mmol), $C_3H_8$ (30 psi, 0.55 mmol), $O_2$ (100 psi initial, 0.66 mmol), the mixture was stirred at 30, 40, 50 or 60° C. for 6 h. The reactions were quenched and analyzed as previously described. Results were plotted in FIG. 6B.

The amount of $H_2O_2$ added was then varied. In a closed stainless-steel reactor, a reaction mixture having $H_2O_2$ (30% aqueous solution, 1, 3, 5, or 10 mol % based on $SO_2$), TFAOH, and TFAA was cooled down to −78° C. in a dry ice bath. After charging with $SO_2$ (40 psi twice, 1.46 mmol), $C_3H_8$ (30 psi, 0.55 mmol), $O_2$ (70 psi initial, 0.43 mmol), the mixture was stirred at 60° C. for 4 h. The reactions were quenched and analyzed as previously described. Results were plotted in FIG. 6C.

Finally, the effects of oxygen pressure were studied. In a closed stainless-steel reactor, a reaction mixture having $H_2O_2$ (0.0013 mL, 30% aqueous solution, 1 mol % based on $SO_2$), TFAOH (0.588 mL), and TFAA (0.0107 mL) was cooled down to −78° C. in a dry ice bath. After charging with $SO_2$ (40 psi twice, 1.46 mmol), $C_3H_8$ (30 psi, 0.55 mmol), $O_2$ (40, 55, 70, 85, 100, 125, 150 psi initial), the mixture was stirred at 60° C. for 4 h. The reactions were quenched and analyzed as previously described. Results were plotted in FIG. 6D.

1.5 General Procedure for n-Butane Sulfonation

TFAOH (0.588 mL) and TFAA (0.01 mL), $H_2O_2$ (1 mol % based on $SO_2$, 0.015 mmol), $SO_2$ (40 psi twice, 1.46 mmol), n-butane (20 psi thrice, 39 mol % based on $SO_2$), and $O_2$ (70 psi initial, 0.27 mmol) were reacted in a stainless-steel reactor at 60° C. for 2 hours. 0.6 mL of $D_2O$ was added to the reaction mixture with the use of TMSP-$d_4$ as an internal standard for referencing and quantification. 2-Butanesulfonic acid $^1$H NMR (400 MHz, $D_2O$), δ 2.78-2.89 (m, 1H), 1.93-2.06 (m, 1H), 1.42-1.56 (m, 1H) 1.32 (d, J=6.9 Hz, 3H), 1.00 ppm (t, J=7.5 Hz, 3H).

2. NMR Analysis 2.1.1. $^{19}$F NMR Spectrum: (470 MHz, TFAD): Generation of Trifluoroacetylsulfuric Acid (TFAOSO$_3$H)

Figure 7:
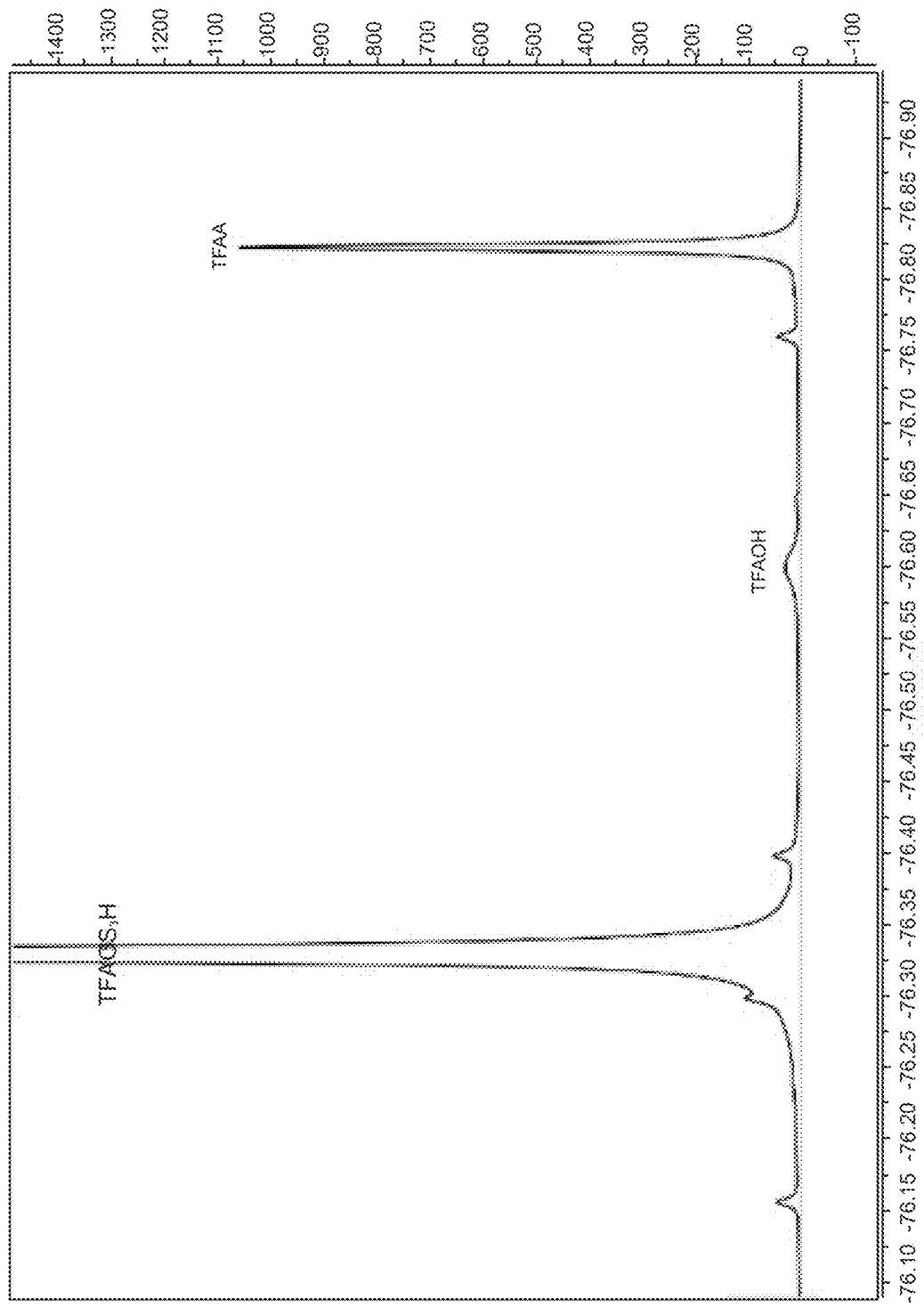
FIG. 7. $^{19}$F NMR spectrum: (470 MHz, TFAD): Generation of trifluoroacetyl sulfuric acid (TFAOSO$_3$H) (section 2.1.1).

This $^{19}$F NMR spectrum is provided in FIG. 7.

After the reaction mixture containing TFAA, TFAOH, $H_2O_2$, $SO_2$ and $O_2$ was stirred at 50° C. for 16 h, TFAOSO$_3$H was extracted with DCM-$d_2$ for NMR analysis. TFAOH, TFAA and $H_2O$ diluted in DCM-$d_2$ were added separately to distinguish the observed peaks from each other. Depending on the amount and the ratio of TFAOH and TFAOSO$_3$H, TFAOH and TFAOSO$_3$H peaks shifted, however, the patter between TFAOSO$_3$H, TFAOH, and TFAA remained the same.

2.1.2. $^1$H NMR Spectrum (400 MHz, TFAD): Unknown Peak at 2.92 ppm

Figure 8:
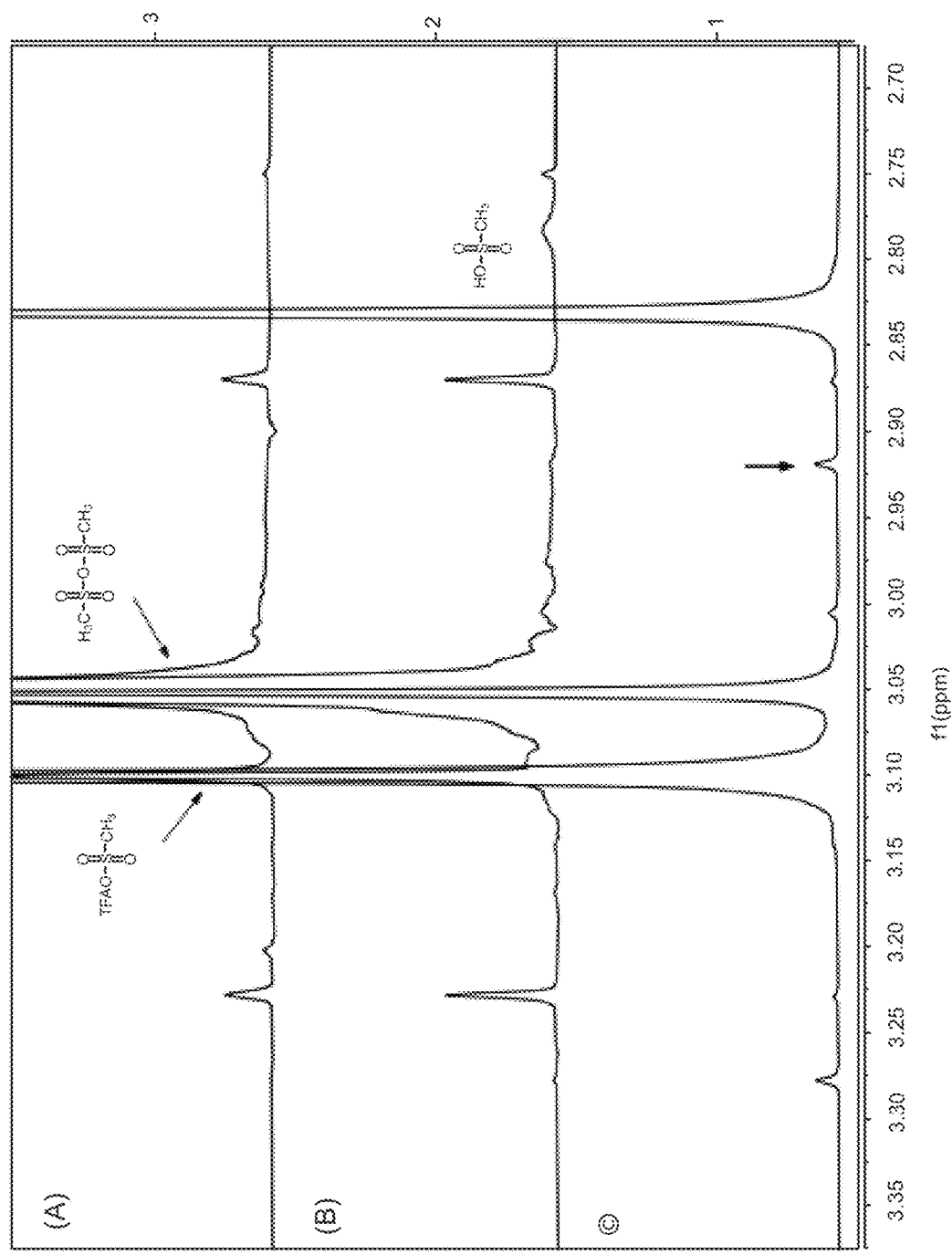
FIG. 8. $^1$H NMR spectrum (400 MHz, TFAD): Unknown peak at 2.92 ppm (section 2.1.2).

This $^1$H NMR spectrum is provided in FIG. 8.

Reaction conditions: (A) When methanesulfonic anhydride (10) was added to the solution of 0.3 mL TFAD and 0.2 mL TFAA, the formation of 7 was detected to exhibit 7 and 10. (B) When 3 μL $H_2O_2$ was added to the solution of (A), no peak was observed at around 2.92 ppm. (C) When 10 μL TFAOSO$_3$H was added to the solution of (A), a small peak around 2.92 ppm was detected.

Figure 4:
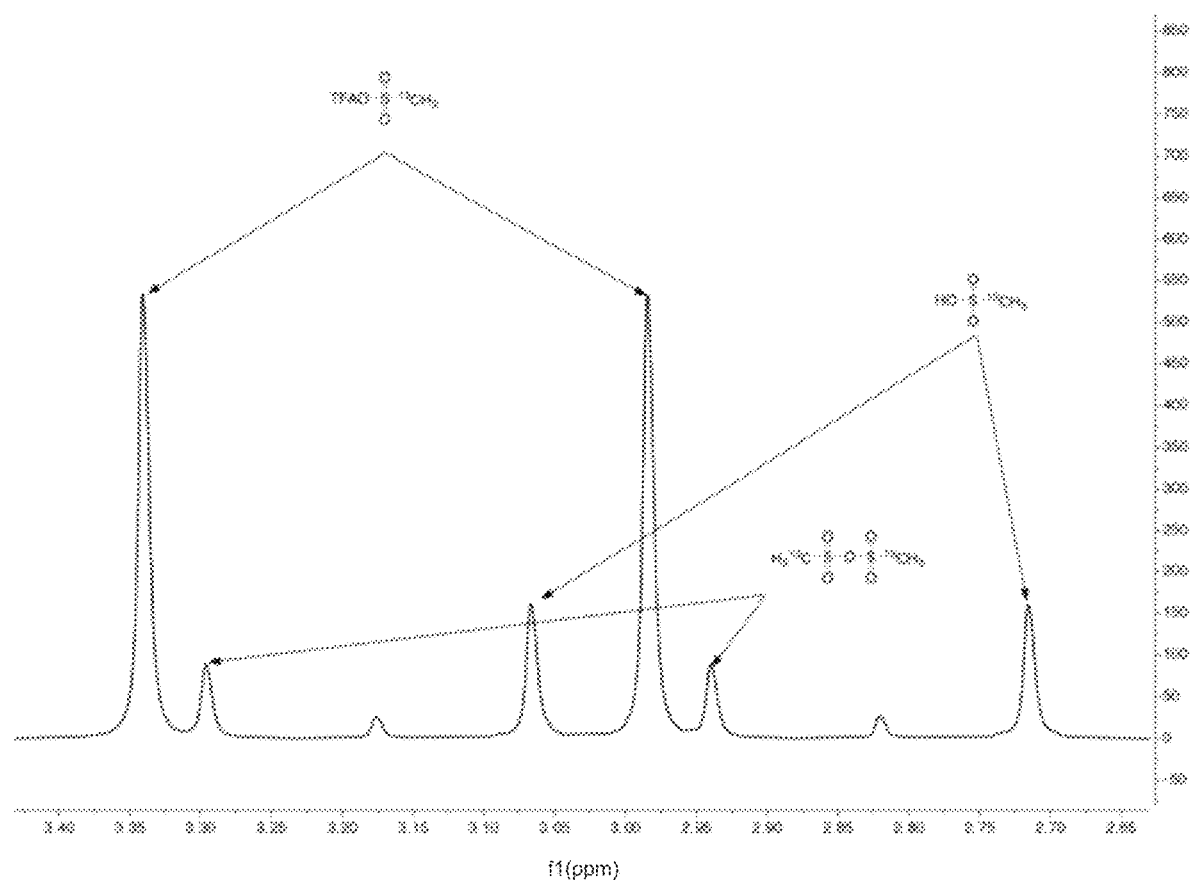
FIG. 4. $^1$H NMR spectrum. Three different forms of products were generated by the methane sulfonation method using SO$_2$ before quenching: methanesulfonyl trifluoroacetic anhydride, methanesulfonic anhydride (MSAA), and methanesulfonic acid (MSA).

In FIG. 4, we identified 7, 10, and MSA, however small peaks at 3.18 and 2.82 ppm were not elucidated unambiguously. However, we conducted the experiments using unlabeled MSAA and obtained NMR spectra as shown here. We identified 7 and 10 along with MSA in these solvent systems, and observed a minor peak at 2.92 ppm, which would correspond with the small peaks at 3.18 and 2.82 ppm in the previous experiment and its NMR spectrum. Thus, we speculate the peak at 2.92 ppm as one of the methanesulfonic anhydride derivative such as

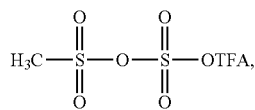

which was hydrolyzed to provide MSA after work-up.

Figure 9:
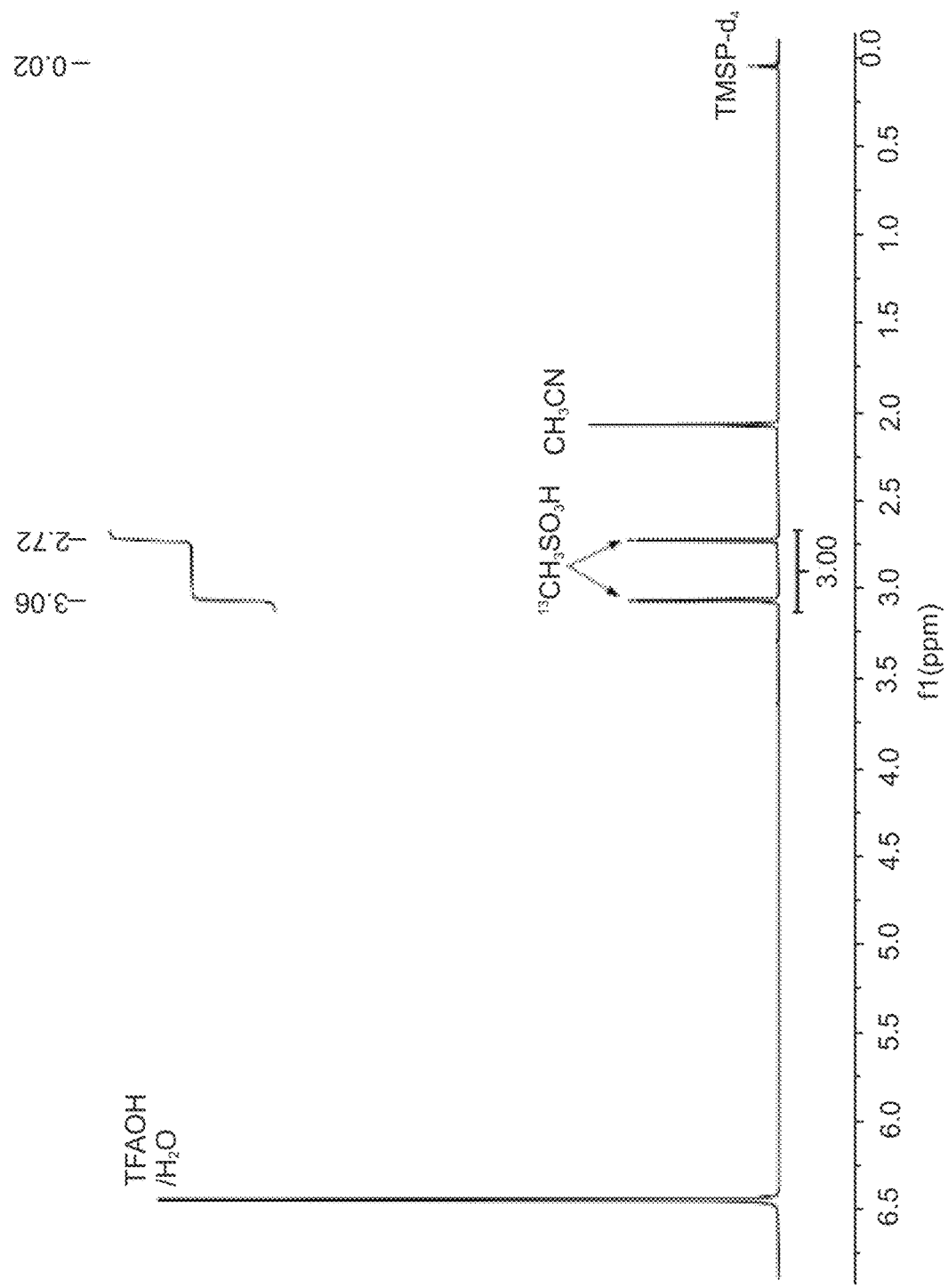
FIG. 9. $^1$H NMR Spectrum (400 MHz, D$_2$O): Sulfonation of methane by Trifluoroacetylsulfuric Acid (section 2.2.1).

2.2.1. $^1$H NMR Spectrum (400 MHz, $D_2O$): Sulfonation of Methane by Trifluoroacetylsulfuric Acid This $^1$H NMR spectrum is provided in FIG. 9.
Reaction conditions: Solvent, TFAOH:TFAA: TFAOSO$_3$H=1:1:1 (0.98 mL, 2.84 mmol); radical initiator $K_2S_2O_8$ (9.5 mol % based on TFAOSO$_3$H, 0.27 mmol); CH$_4$ (400 psi, 3.1 mmol); temperature (50° C.); time (18 h).

2.2.2. Three Different Forms of Products Before Quenching the Reaction: Methanesulfonyl Trifluoroacetic Anhydride (7), Methanesulfonic Anhydride (MSAA, 10), and Methanesulfonic Acid (MSA)

Figure 10:
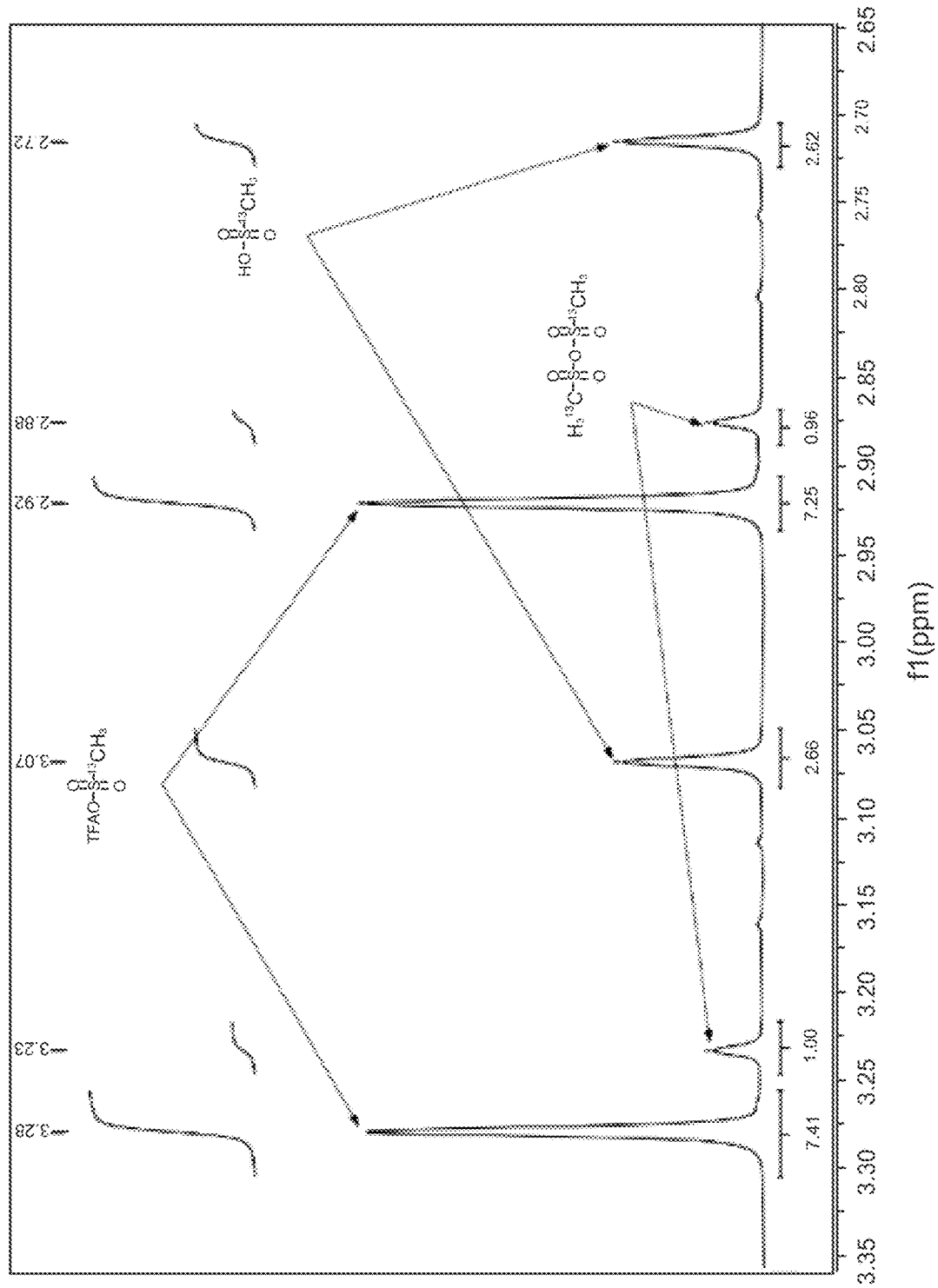
FIG. 10. $^1$H NMR spectrum (400 MHz, TFAOH-d$_1$) (section 2.2.2).
Figure 11:
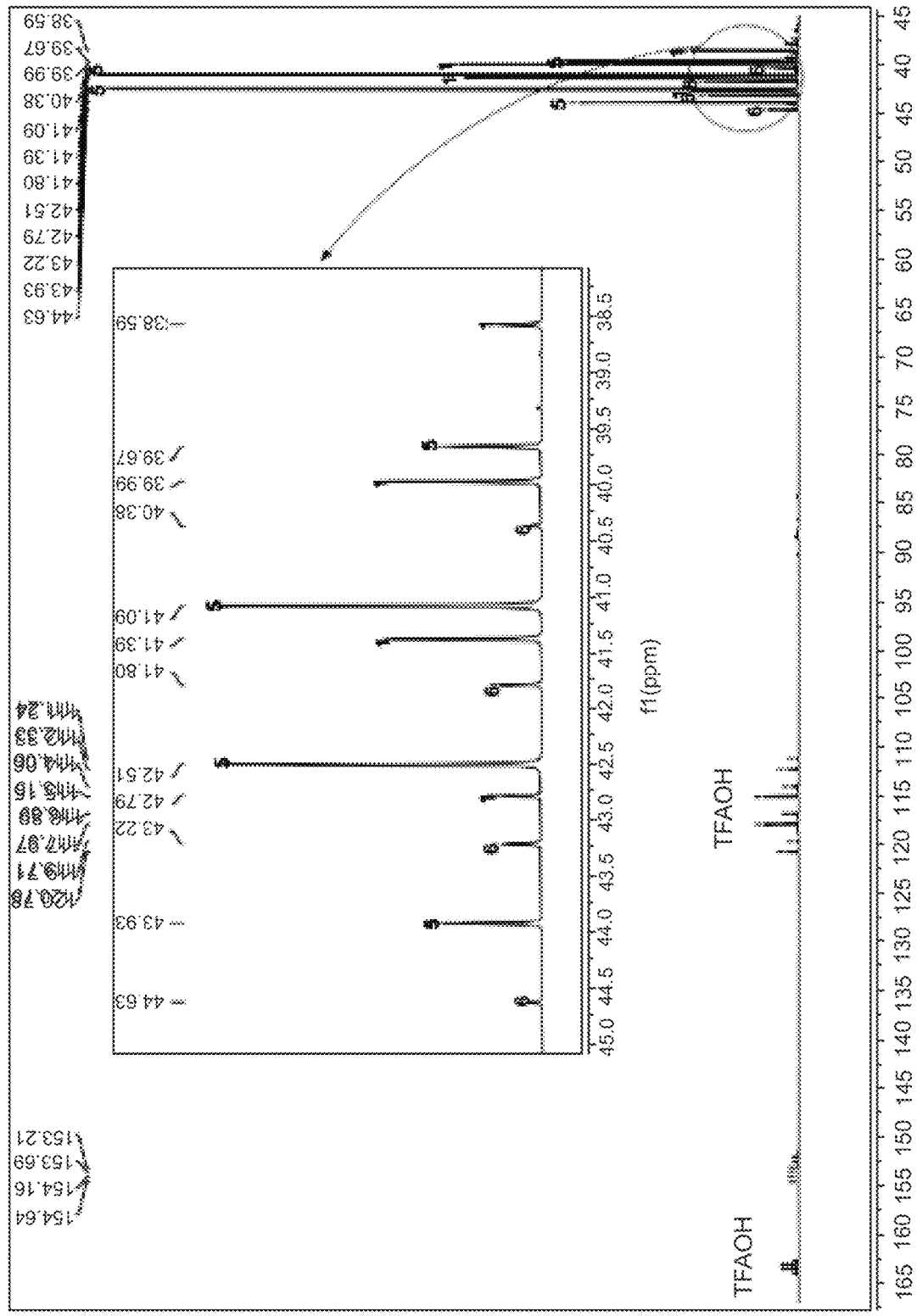
FIG. 11. $^{13}$C NMR spectrum (101 MHz, TFAOH-d$_1$) (section 2.2.2).
Figure 12:
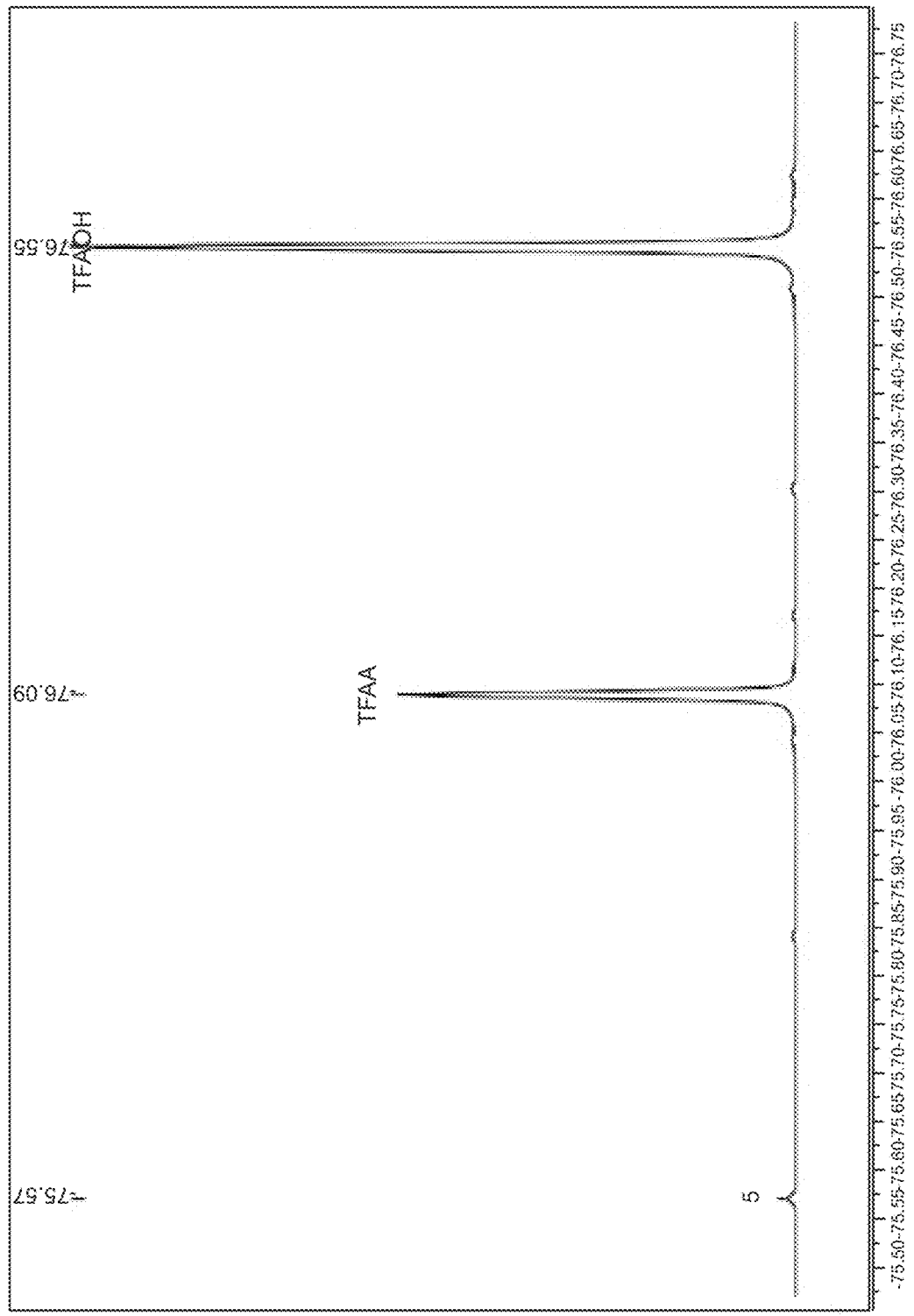
FIG. 12. $^{19}$F NMR spectrum (376 MHz, TFAOH-d$_1$) (section 2.2.2).

$^1$H, $^{13}$C, $^{19}$F NMR spectra are provided in FIG. 10-12.

Before quenching the reaction with water, products were observed in three different forms under equilibrium. Reaction conditions: Solvent, TFAOH:TFAA:TFAOSO$_3$H=1:1:1 (0.98 mL, 2.84 mmol); radical initiator $K_2S_2O_8$ (9.5 mol % based on TFAOSO$_3$H, 0.27 mmol); CH$_4$ (400 psi, 3.1 mmol); temperature (50° C.); time (2 h).

Methanesulfonic acid (MSA) $^1$H NMR (400 MHz, TFAOH-$d_1$): δ 2.89 (d, $J_{C-H}$=140.87 Hz, 3H). $^{13}$C NMR (101 MHz, TFAOH-$d_1$): δ 40.7 (q, $J_{C-H}$=140.9 Hz).

Methanesulfonyl trifluoroacetic anhydride (TFAOSO$_2$CH$_3$, 7) $^1$H NMR (400 MHz, TFAOH-$d_1$): δ 3.10 (d, $J_{C-H}$=143.12 Hz, 3H). $^{13}$C NMR (101 MHz, TFAOH-$d_1$): δ 153.9 (q, $J_{C-F}$=47.9 Hz), 115.5 (q, $J_{C-F}$=284.2 Hz), 41.8 (q, $J_{C-H}$=142.6 Hz). $^{19}$F NMR (376 MHz, TFAOH-$d_1$): δ−75.6.

Methanesulfonic anhydride (MSAA, 10) $^1$H NMR (400 MHz, TFAOH-$d_1$): δ 3.05 (d, $J_{C-H}$=142.13 Hz, 6H). $^{13}$C NMR (101 MHz, TFAOH-$d_1$): δ 42.5 (q, $J_{C-H}$=142.6 Hz).

Figure 13:
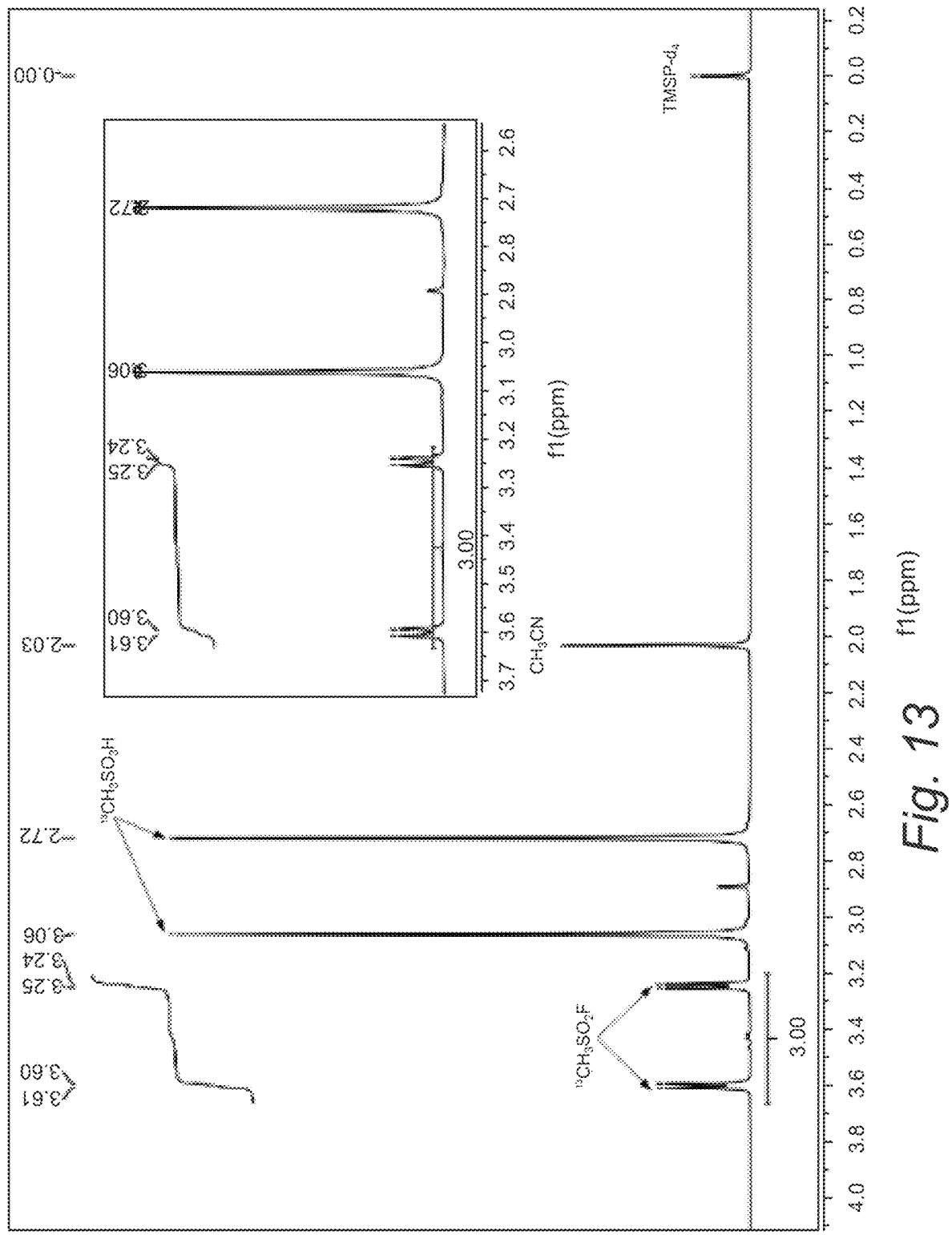
FIG. 13. $^1$H NMR spectrum (400 MHz, D$_2$O) (section 2.2.3).
Figure 14:
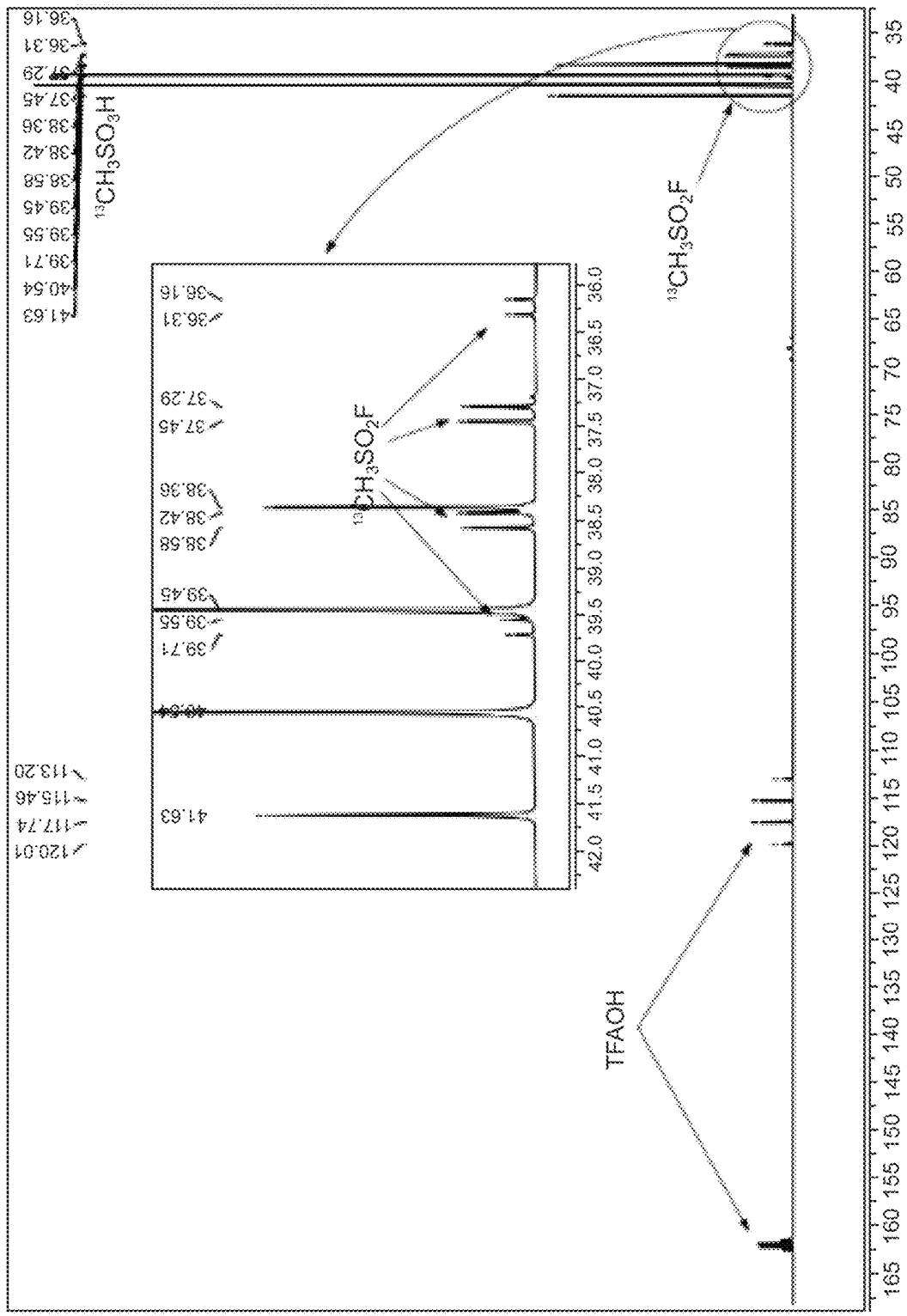
FIG. 14. $^{13}$C NMR spectrum (126 MHz, D$_2$O) (section 2.2.3).
Figure 15:
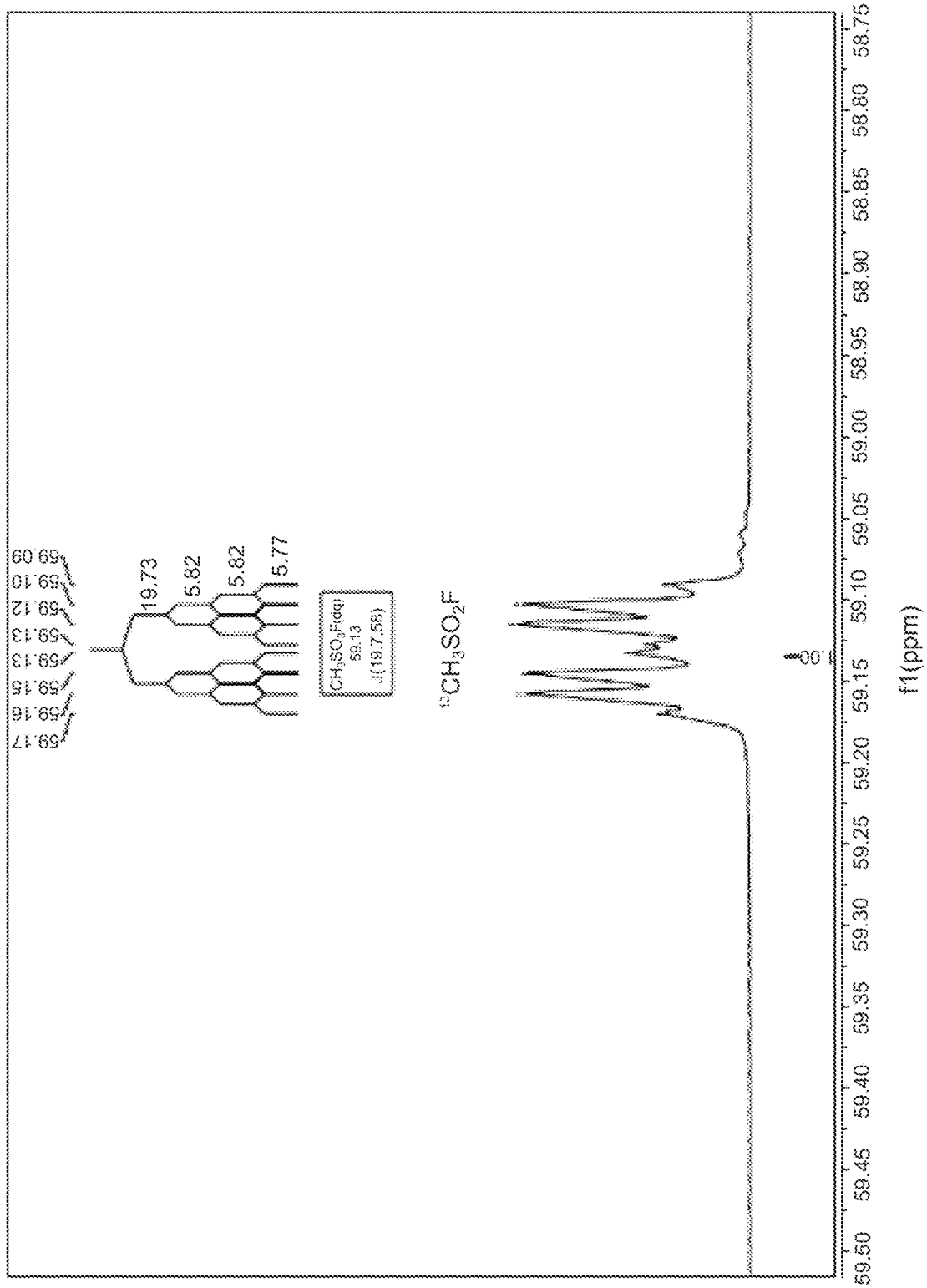
FIG. 15. $^{19}$F NMR spectrum (470 MHz, D$_2$O) (section 2.2.3).

2.2.3. Generation of MSF in Methane Sulfonation Reaction Conducted at High Temperature $^1$H, $^{13}$C, $^{19}$F NMR spectra are provided in FIG. 13-15.

Side product, methanesulfonyl fluoride (MSF) was observed when the reactions were conducted at high temperatures over 70° C. Reaction conditions: TFAOH (2.84 mmol), TFAA (2.84 mmol), TFAOSO$_3$H (2.84 mmol), $K_2S_2O_8$ (15.5 mol % based on TFAOSO$_3$H, 0.44 mmol), and $^{13}$CH$_4$ (400 psi, 3.1 mmol) were reacted in a stainless-steel reactor at 100° C. for 18 hours. 1 mL of $D_2O$ was added to the reaction mixture and CH$_3$CN and TMSP-$d_4$ were used as internal references.

2.2.4. Conversion of MSA to MSF

Only in the presence of radical initiator, potassium persulfate ($K_2S_2O_8$), MSA was successfully converted to MSF in similar reactions where MSA was employed as a substitute for CH$_4$.

Figure 16:
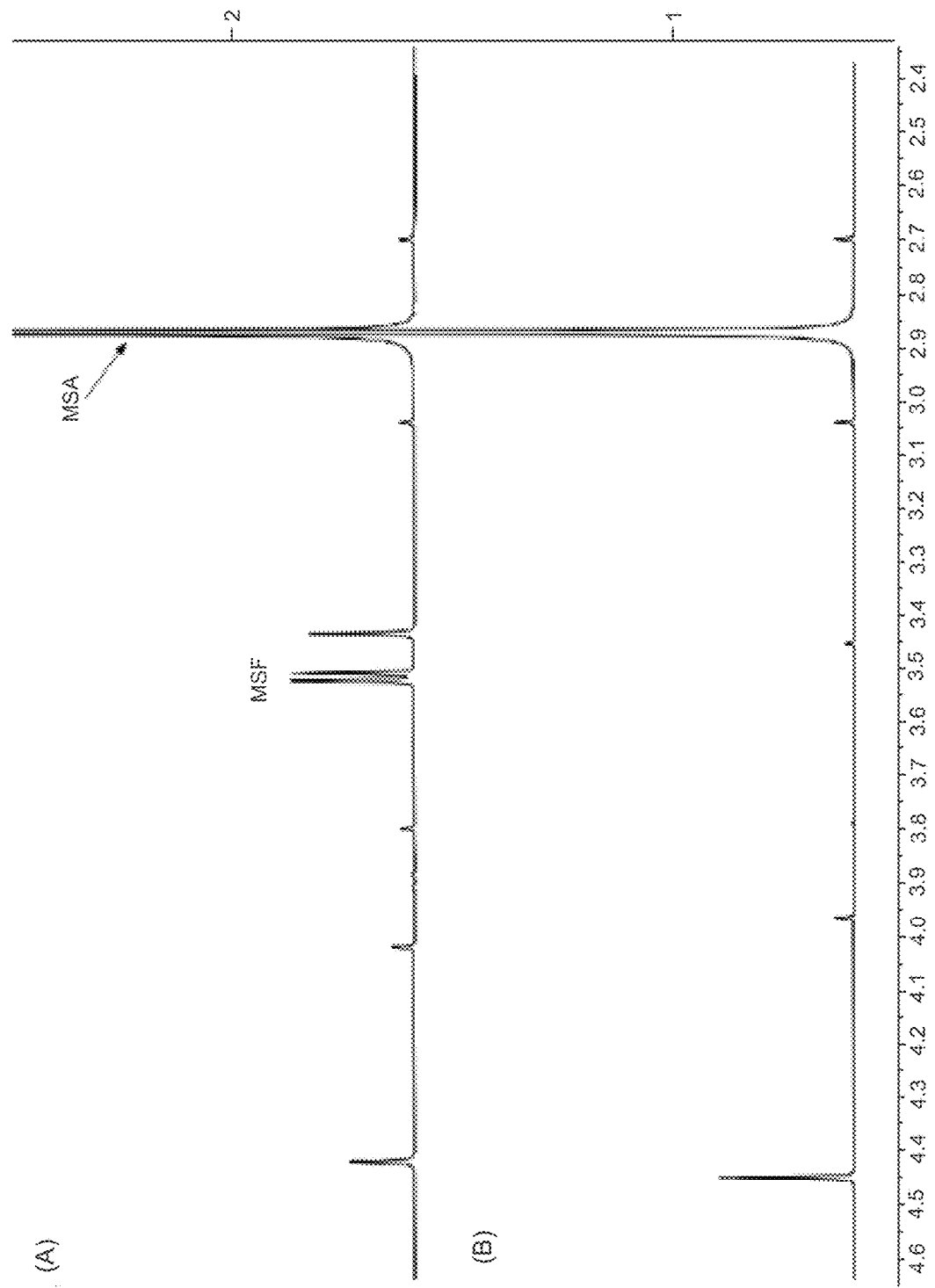
FIG. 16. $^1$H NMR spectrum (400 MHz, D$_2$O): Conversion of MSA to MSF in TFAOH:TFAA:TFAOSO$_3$H solution (section 2.2.4.1).

2.2.4.1. $^1$H NMR Spectrum (400 MHz, $D_2O$): Conversion of MSA to MSF in TFAOH:TFAA:TFAOSO$_3$H Solution This $^1$H NMR spectrum is provided in FIG. 16.
Reaction conditions: MSA (0.1 mL); TFAOH:TFAA: TFAOSO$_3$H=1:1:1 (0.86 mL, 2.5 mmol); 400 psi $N_2$; temperature (100° C.); time (18 h), (A) with radical initiator $K_2S_2O_8$ (60 mg, 0.22 mmol), and (B) in absence of radical initiator.

Figure 17:
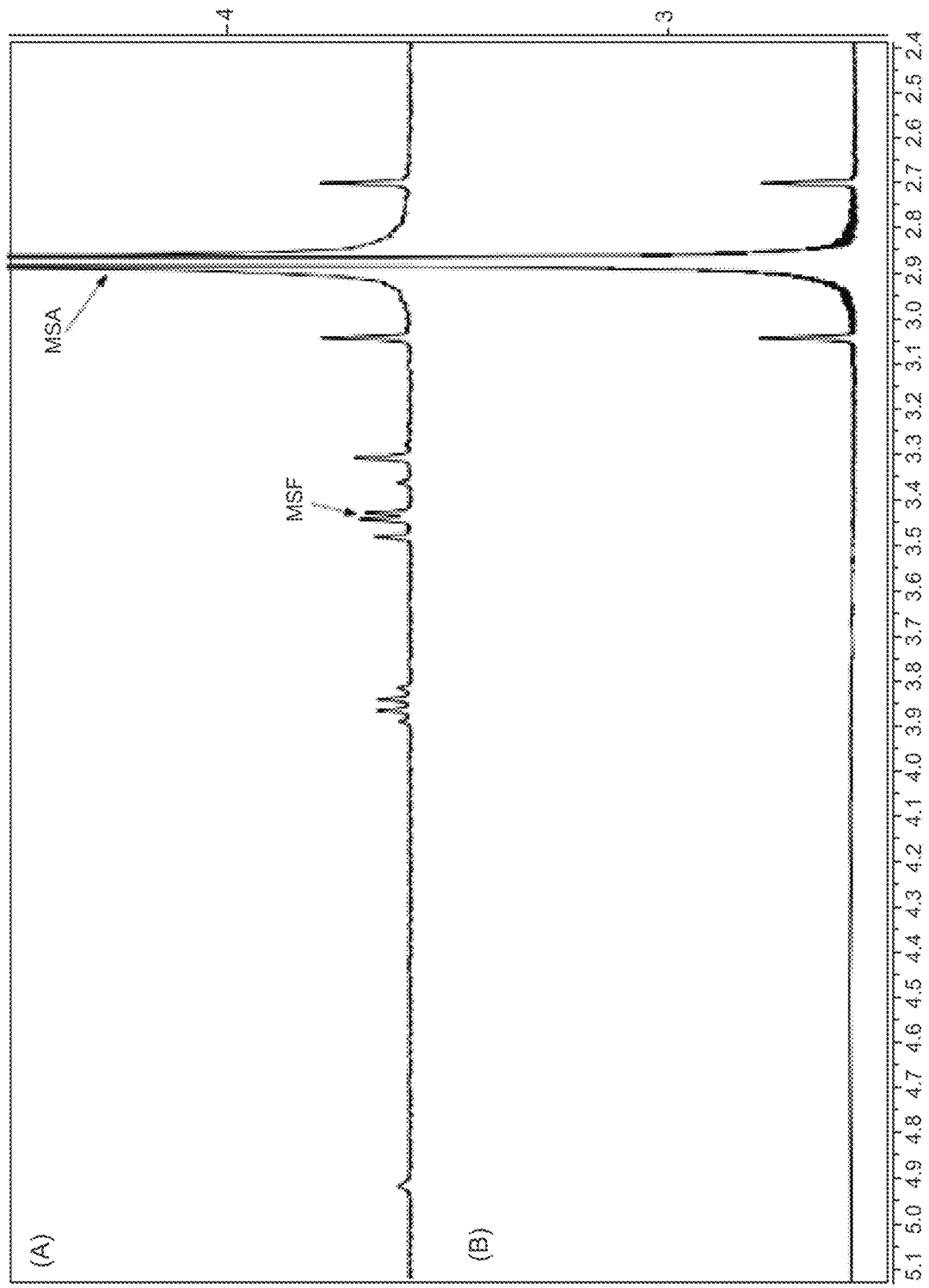
FIG. 17. $^1$H NMR spectrum (400 MHz, D$_2$O): Conversion of MSA to MSF in absence of TFAOSO$_3$H (section 2.2.4.2).

2.2.4.2. $^1$H NMR Spectrum (400 MHz, $D_2O$): Conversion of MSA to MSF in Absence of TFAOSO$_3$H This $^1$H NMR spectrum is provided in FIG. 17.
Reaction conditions: MSA (0.1 mL); TFAOH:TFAA=1:1 (0.86 mL); 400 psi $N_2$; temperature (100° C.); time (18 h), (A) with radical initiator $K_2S_2O_8$ (60 mg, 0.22 mmol), and (B) in absence of radical initiator.

2.2.5. $^1$H NMR Spectrum (400 MHz, $D_2O$): Radical Quenching Process Using TEMPO and BHT (Table S13)

Figure 18:
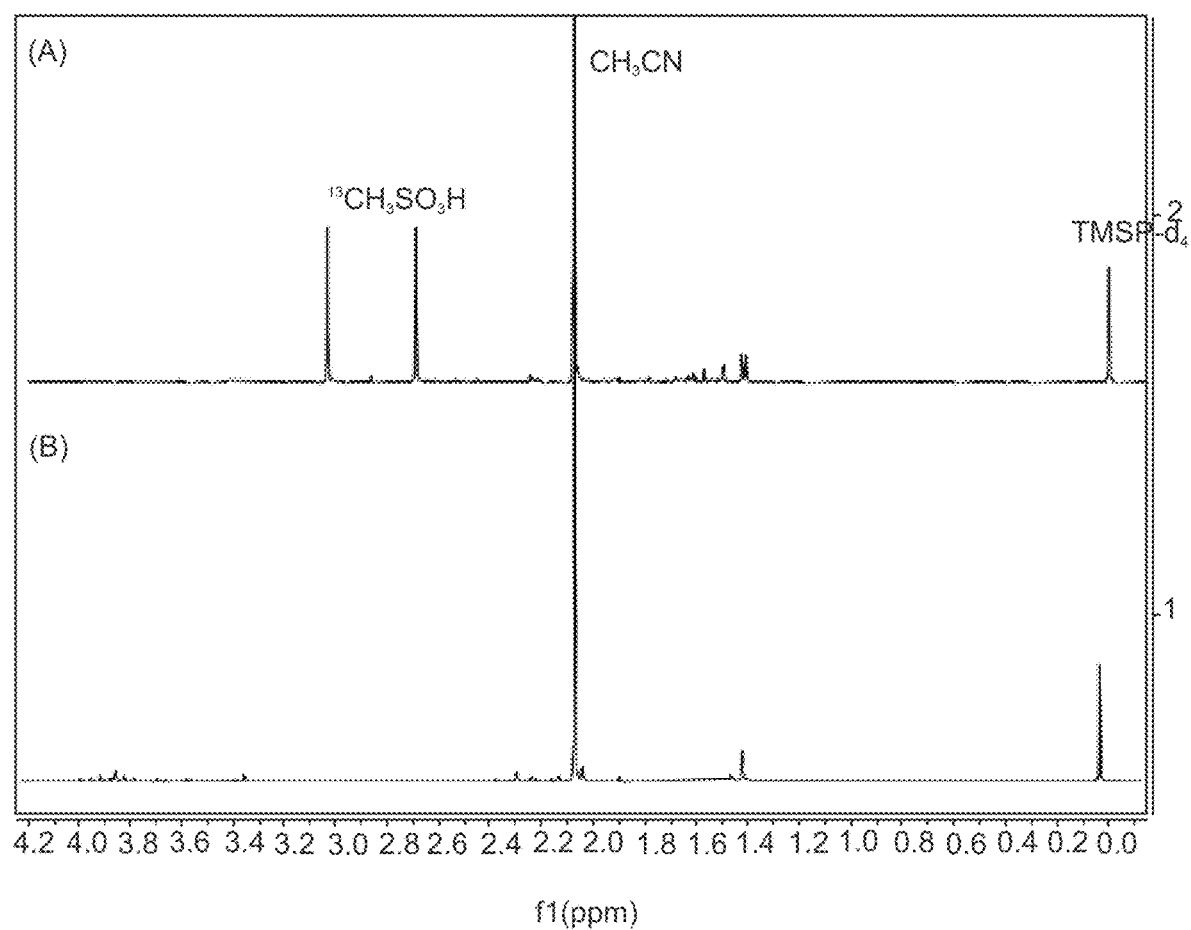
FIG. 18. 2.2.5. $^1$H NMR spectrum (400 MHz, D$_2$O): Radical quenching process using TEMPO and BHT (Table S13) (section 2.2.5).

This $^1$H NMR spectrum is provided in FIG. 18.

Additional details of the invention are found in S. Kim et al. J. Org. Chem. 2022, 87, 15, 10539-10543 Publication Date: Jul. 13, 2022 https://doi.org/10.1021/acs.joc.2c01245 and its supplemental materials and in S. Kim et al. Green Chem., 2022, 24, 7918 Received 21 Jul. 2022, Accepted 23 Sep. 2022; DOI: 10.1039/d2gc02707k and its supplement materials; the entire disclose of these documents is hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

1. Blanksby, S. J.; Ellison, G. B. Bond dissociation energies of organic molecules, *Acc. Chem. Res.* 2003, 36(4), 255-263.
2. Bourzac, K. Methane cuts could slow extreme climate change, *Chem. Eng. News* 2021, 99(39), 28-33.
3. Katada, N.; Nakamura, Y. II, M.; Niwa, M. Oxidation of sulfur dioxide to sulfuric acid over activated carbon catalyst produced from wood, *J. Jpn. Pet. Inst.* 2003, 46(6), 392-395.
4. Periana, R. A.; Mironov, O.; Taube, D.; Bhalla, G.; Jones, C. J. Catalytic, oxidative condensation of $CH_4$ to $CH_3COOH$ in one step via CH activation, *Science* 2003, 301(5634), 814-818.
5. Lin, M.; Hogan, T.; Sen, A. A highly catalytic bimetallic system for the low-temperature selective oxidation of methane and lower alkanes with dioxygen as the oxidant, *J. Am. Chem. Soc.* 1997, 119(26), 6048-6053.
6. Kao, L. C.; Hutson, A. C.; Sen, A. Low-temperature, palladium(II)-catalyzed, solution-phase oxidation of methane to a methanol derivative, *J. Am. Chem. Soc.* 1991, 113, 700-701.
7. Ingrosso, G.; Midollini, N. Palladium(II)- or copper(II)-catalysed solution-phase oxyfunctionalisation of methane and other light alkanes by hydrogen peroxide in trifluoroacetic anhydride, *J. Mol. Catal. A: Chem.* 2003, 204-205, 425-431.
8. Muehlhofer, M.; Strassner, T.; Herrmann, W. A. New catalyst systems for the catalytic conversion of methane into methanol, *Angew. Chem., Int. Ed.* 2002, 41, 1745-1747.
9. Mathew, A. E.; Mejillano, M. R.; Nath, J. P.; Himes, R. H.; Stella, V. J. Synthesis and evaluation of some water-soluble prodrugs and derivatives of taxol with antitumor activity, *J. Med. Chem.* 1992, 35, 145-151.
10. Low, C. T. J.; Walsh, F. C. Electrodeposition of tin, copper and tin-copper alloys from a methanesulfonic acid electrolyte containing a perfluorinated cationic surfactant, *Surf. Coat. Technol.* 2008, 202(8), 1339-1349.
11. Snyder, J. C.; Grosse, A. V. Reaction of methane with sulfur trioxide. U.S. Pat. No. 2,493,038, 1950.
12. Basickes, N.; Hogan, T. E.; Sen, A. Radical-initiated functionalization of methane and ethane in fuming sulfuric acid. *J. Am. Chem. Soc.* 1996, 118(51), 13111-13112.
13. Mukhopadhyay, S.; Bell, A. T. High-yield approach to the sulfonation of methane to methanesulfonic acid initiated by $H_2O_2$ and a metal chloride, *Angew. Chem., Int. Ed.* 2003, 42, 2990-2993.
14. Diaz-Urrutia, C.; Ott, T. Activation of methane to $CH_3^+$: a selective industrial route to methanesulfonic acid, *Science* 2019, 363, 1326-1329.
15. Roytman, V. A.; Singleton, D. A. Comment on "Activation of methane to $CH_3^+$: a selective industrial route to methanesulfonic acid: *Science* 2019, 364, eaax7083.
16. Zargari, N.; Winter, P.; Liang, Y.; Lee, J. H.; Cooksy, A.; Houk, K. N.; Jung, K. W. Unexpected, latent radical reaction of methane propagated by trifluoromethyl radicals. *J. Org. Chem.* 2016, 81, 9820-9825.
17. Kim, S.; Wang, J. C.; Lee, J. H.; Jung, K. W. Methane sulfonation via a free radical mechanism by trifluoroacetylsulfuric acid, *J. Org. Chem.* 2022, 87, 10539-10543, DOI:10.1021/acs.joc.2c01245.
18. Dupart, Y.; King, S. M.; Nekat, B.; George, C. Mineral dust photochemistry induces nucleation events in the presence of $SO_2$, *Proc. Natl. Acad. Sci. U.S.A.* 2012, 109(51), 20842-20847.
19. Kuo, Y. P.; Cheng, B. M.; Lee, Y. P. Production and trapping of $HOSO_2$ from the gaseous reaction $OH+SO_2$: the infrared absorption of $HOSO_2$ in solid argon, *Chem. Phys. Lett.* 1991, 177(2), 195-199.
20. Benson, S. W. Thermochemistry and kinetics of sulfur containing molecules and radicals. *Chem. Rev.* 1978, 78(1), 23-35.
21. Hodgins, J. W.; Haines, R. L. The formation of trifluoromethyl radicals in the gas phase. *Can. J. Chem.* 1952, 30, 473-481.
22. (a) Pipaliya, B. V.; Chakraborti, A. K. Cross-dehydrogenative coupling of heterocyclic scaffolds with unfunctionalized aroyl surrogates by Palladium(II) catalyzed C(sp2)-H aroylation through organocatalytic dioxygen activation. *J. Org. Chem.* 2017, 82, 3767-3780. (b) Seth, K.; Nautiyal, M.; Purohit, P.; Parikh, N.; Chakraborti, A. K. Palladium catalyzed Csp2-H activation for direct aryl hydroxylation: the unprecedented role of 1,4-dioxane as a source of hydroxyl radicals. *Chem. Commun.* 2015, 51, 191-194.
23. (14) (a) Pipaliya, B. V.; Seth, K.; Chakraborti, A. K. Ruthenium (II) catalyzed C(sp2)-H bond alkenylation of 2-Arylbenzo[d]oxazole and 2-arylbenzo[d]thiazole with unactivated olefins. *Chem. Asian J.* 2021, 16, 87-96. (b) Pipaliya, B. V.; Chakraborti, A. K. Ligand-assisted heteroaryl C(sp2)-H bond activation by a cationic Ruthenium (II) complex for alkenylation of heteroarenes with alkynes directed by biorelevant heterocycles. *ChemCatChem.* 2017, 9, 4191-4198. (c) Seth, K.; Roy, S. R.; Kumar, A.; Chakraborti, A. K. The palladium and copper contrast: a twist to products of different chemotypes and altered mechanistic pathways. *Catal. Sci. Technol.* 2016, 6, 2892-2896. (d) Seth, K.; Raha Roy, S.; Chakraborti, A. K. Synchronous double C—N bond formation via C—H activation for a novel synthetic route to phenazine. *Chem. Commun.* 2016, 52, 922-925.

What is claimed is:

1. A method for sulfonating a hydrocarbon, the method comprising:
   providing a solvent mixture of trifluoroacetic acid and trifluoroacetic acid anhydride that is substantially water free;

adding hydrogen peroxide, an alkane, molecular oxygen, and sulfur dioxide to the solvent mixture to form a reaction mixture;

allowing the reaction mixture to react for a predetermined time within a predetermined temperature range and within a predetermined pressure range; and quenching the reaction mixture to obtain a sulfonated alkane.

2. The method of claim 1 wherein the alkane is a $C_{1-10}$ alkane.

3. The method of claim 2 wherein the $C_{1-10}$ alkane is selected from the group consisting of methane, ethane, propane, butane, isobutane, pentanes, hexanes, octanes, and combinations thereof.

4. The method of claim 3, wherein $C_{1-10}$ alkane is methane, ethane, or propane.

5. The method of claim 1 wherein the alkane is a $C_{3-10}$ cycloalkane.

6. The method of claim 5 wherein the $C_{3-10}$ cycloalkane is selected from the group consisting of cyclopropanesulfonic acid, cyclobutanesulfonic acid, cyclopentanesulfonic acid, and cyclohexaneulfonic acid, and combinations thereof.

7. The method of claim 5 wherein the $C_{3-10}$ cycloalkane are selected from the group consisting of cyclopropane, cyclobutane, cyclopentane, and cyclohexane.

8. The method of claim 1, wherein $C_{1-10}$ alkane is methane.

9. The method of claim 1, wherein the reaction mixture is quenched with water.

10. The method of claim 1, wherein the predetermined time is from 1 to 30 hours.

11. The method of claim 1, wherein the predetermined temperature range is from 40 to 100° C.

12. The method of claim 1, wherein the predetermined pressure range is from 15 to 800 psi.

13. The method of claim 1, wherein the reaction mixture includes hydrogen peroxide in an amount from about 4 to 160 mol % relative to sulfur dioxide.

14. The method of claim 1, wherein the reaction mixture includes hydrogen peroxide in an amount from about 10 to 30 mol % relative to sulfur dioxide.

15. The method of claim 1, wherein the molar ratio of trifluoroacetic acid to trifluoroacetic acid anhydride is from about 0.3 to 3.

16. The method of claim 1, wherein the molar ratio of trifluoroacetic acid to trifluoroacetic acid anhydride is from about 0.8 to 1.2.

17. The method of claim 2, wherein the $C_{1-10}$ alkane is present in a sufficient amount so that the $C_{1-10}$ alkane is the limiting reagent.

18. The method of claim 2, wherein the molar ratio of $C_{1-10}$ alkane to sulfur dioxide is greater than 1.

19. The method of claim 2, wherein the molar ratio of $C_{1-10}$ alkane to sulfur dioxide is greater than 1.5.

20. A method for preparing trifluoroacetyl sulfuric acid, the method comprising:

providing a solvent consisting of trifluoroacetic acid, trifluoroacetic acid anhydride, and mixtures thereof that is substantially water-free;

adding molecular oxygen and sulfur dioxide to the solvent to form a reaction mixture; and allowing the reaction mixture to react for a predetermined time within a predetermined temperature range and within a predetermined pressure range.

21. The method of claim 20, wherein the predetermined time is from 1 to 30 hours, the predetermined temperature range is from 40 to 100° C., and the predetermined pressure range is from 10 to 400 psi.

* * * * *